(12) United States Patent  
Logan et al.

(10) Patent No.: US 10,978,713 B2  
(45) Date of Patent: Apr. 13, 2021

(54) CATHODES FOR MICROBIAL ELECTROLYSIS CELLS AND MICROBIAL FUEL CELLS

(71) Applicant: The Penn State Research Foundation, University Park, PA (US)

(72) Inventors: Bruce E. Logan, State College, PA (US); Douglas Call, Spring Mills, PA (US); Matthew Merrill, State College, PA (US); Shaoan Cheng, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 16/396,989

(22) Filed: Apr. 29, 2019

(65) Prior Publication Data

US 2019/0326604 A1    Oct. 24, 2019

Related U.S. Application Data

(63) Continuation of application No. 12/649,945, filed on Dec. 30, 2009, now abandoned, which is a  
(Continued)

(51) Int. Cl.  
*H01M 4/86* (2006.01)  
*H01M 4/90* (2006.01)  
(Continued)

(52) U.S. Cl.  
CPC ....... *H01M 4/8605* (2013.01); *H01M 4/9008* (2013.01); *H01M 8/16* (2013.01);  
(Continued)

(58) Field of Classification Search  
CPC ....... H01M 2004/8689; H01M 4/8605; H01M 4/8657; H01M 4/8853; H01M 4/9008;  
(Continued)

(56) References Cited

U.S. PATENT DOCUMENTS 3,403,053 A * 9/1968 Del Duca ............... H01M 8/16  
429/2  
4,362,790 A 12/1982 Blanchart et al.  
(Continued)

FOREIGN PATENT DOCUMENTS

KR    1020080066460    7/2008  
NO    168145    10/1991  
(Continued)

OTHER PUBLICATIONS

Oh, S. et al., Proton exchange membrane and electrode surface areas as factors that affect power generation in microbial fuel cells, *Applied Microbiology and Biotechnology*, 70:162-169, 2006.  
(Continued)

*Primary Examiner* — Adam A Arciero  
(74) *Attorney, Agent, or Firm* — Julie K. Staple; Dinsmore & Shohl LLP

(57) ABSTRACT

An apparatus is provided according to embodiments of the present invention which includes a reaction chamber having a wall defining an interior of the reaction chamber and an exterior of the reaction chamber; exoelectrogenic bacteria disposed in the interior of the reaction chamber; an aqueous medium having a pH in the range of 3-9, inclusive, the aqueous medium including an organic substrate oxidizable by exoelectrogenic bacteria and the medium disposed in the interior of the reaction chamber. An inventive apparatus further includes an anode at least partially contained within the interior of the reaction chamber; and a brush or mesh cathode including stainless steel, nickel or titanium, the cathode at least partially contained within the interior of the reaction chamber.

20 Claims, 20 Drawing Sheets

Related U.S. Application Data continuation-in-part of application No. 12/177,962, filed on Jul. 23, 2008, now abandoned, which is a continuation-in-part of application No. 11/799,194, filed on May 1, 2007, now Pat. No. 8,962,165, said application No. 12/649,945 is a continuation-in-part of application No. 12/145,722, filed on Jun. 25, 2008, now Pat. No. 7,922,878, which is a continuation-in-part of application No. 11/799,194, filed on May 1, 2007, now Pat. No. 8,962,165, and a continuation-in-part of application No. 11/180,454, filed on Jul. 13, 2005, now Pat. No. 7,491,453, said application No. 12/649,945 is a continuation-in-part of application No. 11/799,149, filed on May 1, 2007, now Pat. No. 8,277,984.

(60) Provisional application No. 61/141,511, filed on Dec. 30, 2008, provisional application No. 60/951,303, filed on Jul. 23, 2007, provisional application No. 60/796,761, filed on May 2, 2006, provisional application No. 60/945,991, filed on Jun. 25, 2007, provisional application No. 60/608,703, filed on Sep. 10, 2004, provisional application No. 60/588,022, filed on Jul. 14, 2004.

(51) Int. Cl.
   *H01M 8/16* (2006.01)
   *H01M 4/88* (2006.01)
   *H01M 4/92* (2006.01)

(52) U.S. Cl.
   CPC ........ *H01M 4/8657* (2013.01); *H01M 4/8853* (2013.01); *H01M 4/9016* (2013.01); *H01M 4/92* (2013.01); *H01M 2004/8689* (2013.01); *Y02E 60/36* (2013.01); *Y02E 60/50* (2013.01)

(58) Field of Classification Search
   CPC ........ H01M 4/9016; H01M 4/92; H01M 8/16; Y02E 60/366; Y02E 60/527
   See application file for complete search history.

(56) References Cited

U.S. PATENT DOCUMENTS

| | | | |
|---|---|---|---|
| 4,652,501 A | 3/1987 | Bennetto et al. | |
| 4,891,404 A | 1/1990 | Narayan | |
| 5,256,501 A | 10/1993 | Hasvold et al. | |
| 5,427,871 A * | 6/1995 | Garshol .................. | H01M 6/34 429/119 |
| 5,683,558 A | 11/1997 | Sieck et al. | |
| 5,723,098 A | 3/1998 | Salzburg et al. | |
| 5,753,098 A | 5/1998 | Bess, Jr. et al. | |
| 5,976,719 A | 11/1999 | Kim et al. | |
| 6,090,266 A | 7/2000 | Roychowdhury | |
| 6,217,822 B1 | 4/2001 | Borglum | |
| 6,887,692 B2 | 5/2005 | Paterek | |
| 7,226,675 B2 | 6/2007 | Ovshinsky et al. | |
| 7,491,453 B2 | 2/2009 | Logan et al. | |
| 8,962,165 B2 | 2/2015 | Logan | |
| 2002/0025469 A1 | 2/2002 | Heller | |
| 2004/0094406 A1 | 5/2004 | Sawada | |
| 2004/0241528 A1 | 12/2004 | Chiao et al. | |
| 2005/0095466 A1 | 5/2005 | Minteer et al. | |
| 2005/0161342 A1 | 7/2005 | Carson et al. | |
| 2005/0266161 A1 | 12/2005 | Medeiros et al. | |
| 2006/0011489 A1 | 1/2006 | Swanepoel et al. | |
| 2006/0011491 A1 * | 1/2006 | Logan ....................... | C25B 9/00 205/637 |
| 2006/0147763 A1 | 7/2006 | Angenent et al. | |
| 2006/0160200 A1 | 7/2006 | Rathenow et al. | |
| 2006/0172186 A1 | 8/2006 | Tender | |
| 2006/0234110 A1 | 10/2006 | Bergel | |
| 2006/0251959 A1 | 11/2006 | Karamanev | |
| 2007/0042480 A1 | 2/2007 | Rozendal et al. | |
| 2007/0048577 A1 | 3/2007 | Ringeisen et al. | |
| 2007/0062820 A1 | 3/2007 | Smotkin | |
| 2007/0172710 A1 | 7/2007 | Kruesi | |
| 2007/0196722 A1 | 8/2007 | Tomita et al. | |
| 2007/0224466 A1 | 9/2007 | Nakagawa et al. | |
| 2007/0259216 A1 | 11/2007 | Logan | |
| 2007/0259217 A1 | 11/2007 | Logan | |
| 2008/0220292 A1 | 9/2008 | Rabaey et al. | |
| 2008/0251445 A1 | 10/2008 | Kamleiter et al. | |
| 2008/0277273 A1 | 11/2008 | Logan | |
| 2008/0286624 A1 | 11/2008 | Lovley et al. | |
| 2008/0292912 A1 | 11/2008 | Logan et al. | |
| 2009/0029198 A1 | 1/2009 | Jin et al. | |

FOREIGN PATENT DOCUMENTS

| | | |
|---|---|---|
| WO | WO-91/03079 | 3/1991 |
| WO | WO-0139306 | 5/2001 |
| WO | WO-2004/015172 | 2/2004 |
| WO | WO-2005005981 | 1/2005 |
| WO | WO-2007/010313 | 1/2007 |
| WO | WO-2007113314 A1 | 10/2007 |
| WO | WO-2008/063843 | 5/2008 |
| WO | WO-2008/109962 | 9/2008 |
| WO | WO-2010045072 | 4/2010 |

OTHER PUBLICATIONS

Logan, B. et al., Graphite Fiber Brush Anodes for Increased Power Production in Air Cathode Microbial Fuel Cells, *Environmental Science and Technology*, 41:3341-3346, 2007.

Oh, S. et al., Cathode Performance as a Factor in Electricity Generation in Microbial Fuel Cells, *Environmental Science and Technology*, 38:4900-4904, 2004.

Liu, H. et al., Power Generation in Fed-Batch Microbial Fuel Cells as a Function of Ionic Strength, Temperature, and Reactor Configuration, *Environmental Science and Technology*, 39:5488-5493, 2005.

Cheng, S. et al., Increased Power Generation in a Continuous Flow MFC with Adjective Flow through the Porous Anode and Reduced Electrode Spacing, *Environmental Science and Technology*, 40:2426-2432, 2006.

Logan, B. et al., Microbial Fuel Cells: Methodology and Technology, *Environmental Science and Technology*, 40:5181-5192, 2006.

Chang, S. et al., Ammonia treatment of carbon cloth anodes to enhance power generation of microbial fuel cells, *Electrochemistry Communications*, 9:492-496, 2007.

Cheng, S. et al., Power Densities Using Different Cathode Catalysts (Pt and CoTMPP) and Polymer Binders (Nafion and PTFE) in Single Chamber Microbial Fuel Cells, *Environmental Science and Technology*, 40:364-369, 2006.

Cheng, S. et al., Increased performance of single-chamber microbial fuel cells using an improved cathode structure, *Electrochemisty Communications*, 8:489-494, 2006.

Liu, H. et al., Electrochemically Assisted Microbial Production of Hydrogen from Acetate, *Environmental Science and Technology*, 39:4317-4320, 2006.

Liu, H. et al., Electricity Generation Using an Air-Cathode Single Chamber Microbial Fuel Cell in the Presence and Absence of a Proton Exchange Membrane, Environmental Science and Technology, 38:4040-4046, 2004.

Liu, H. et al., Production of Electricity during Wastewater Treatment Using a Single Chamber Microbial Fuel Cell. Environmental Science and Technology 38:2281-2285, 2004.

Liu, H. et al., Production of Electricity from Acetate or Butyrate Using a Single-Chamber Microbial Fuel Cell, Environmental Science and Technology, 39: 658-662, 2004.

Kim, J. et al., Power Generation Using Different Cation, Anion, and Ultrafiltration Membranes in Microbial Fuel Cells, Environmental Science and Technology, 41: 1004-1009; 2007.

Zuo, Y. et al., Electricity Production from Steam-Exploded Corn Stover Biomass, Energy and Fuels, 20:1716-1721, 2006.

(56) References Cited

OTHER PUBLICATIONS

Kim, J. et al., Evaluation of procedures to acclimate a microbial fuel cell for electricity production, Applied Microbiology and Biotechnology, 68:23-30, 2005.

Logan, B. et al., Electricity-producing bacterial communities in microbial fuel cells, TRENDS in Microbiology, 14: 512-518, 2006.

Chiou, C. et al., Contaminant Sorption by Soil and Bed Sediment, U.S. Department of the Interior, U.S. Geological Survey: Reston, VA, 2000.

Rabaey, K. et al., Microbial Fuel Cells for Sulfide Removal, Environmental Science and Technology, 40:5218-5224, 2006.

Reimers, C. et al., Harvesting Energy from the Marine Sediment-Water Interface, Environmental Science and Technology, 35:192-195, 2001.

Finkelstein, D. et al., Effect of Electrode Potential on Electrode-Reducing Microbiota, *Environmental Science and Technology*, 40:6990-6995, 2006.

He, Z. et al., An Upflow Microbial Fuel Cell with an Interior Cathode: Assessment of the Internal Resistance by Impedance Spectroscopy, *Environmental Science and Technology*, 40:5212-5217, 2006.

Cai, M. et al., Enhanced Biohydrogen Production from Sewage Sludge with Alkaline Pretreatment, *Environmental Science and Technology*, 38:3195-3202, 2004.

Hasvold, O. et al., Sea-Water battery for subsea control systems, *Journal of Power Sources*, 65:253-261, 1997.

Hasvold, O. et al., Electrochemical power sources for unmanned underwater vehicles used in deep sea survey operations, *Journal of Power Sources*, 96: 252-258, 2001.

Cooper, K. et al., Electrical test methods for on-line fuel cell ohmic resistance measurement, *Journal of Power Sources*, 160:1088-1095, 2006.

Tender, L. et al., Harnessing microbially generated power on the seafloor, *Nature Biotechnology*, 20:821-825, 2002.

Chaudhuri, S. et al., Electricity generation by direct oxidation of glucose in mediatorless microbial fuel cells, *Nature Biotechnology*, 21:1229-1232, 2003.

Lovley, D., Microbial Energizers: Fuel Cells That Keep on Going, *Microbe*, 1: 323-329, 2006.

Lowy, D. et al., Harvesting energy from the marine sediment—water interface II Kinetic activity of anode materials, *Biosensors and Bioelectronics*, 21:2058-2063, 2006.

Brennan, R. et al., Chitin and corncobs as electron donor sources for the reductive dechlorination of tetrachloroethene, Water Research, 40:2125-2134, 2006.

Niessen, J. et al., Fluorinated polyanilines as superior materials for electrocatalytic anodes in bacterial fuel cells, Electrochemistry Communications, 6:571-575, 2004.

Kim, N. et al., Effect of Initial Carbon Sources on the Performance of Microbial Fuel Cells Containing Proteus vulgaris, Biotechnology and Bioengineering, 70:109-114, 2000.

Bond, D. et al., Electrode-Reducing Microorganisms that Harvest Energy from Marine Sediments, Science, 295:483-485, 2002.

Bond, D. et al., Electricity Production by Geobacter sulfurreducens Attached to Electrodes, *Applied and Environmental Microbiology*, 69:1548-1555, 2003.

Park, D. et al., Electricity Generation in Microbial Fuel Cells Using Neutral Red as an Electronophore, *Applied and Environmental Microbiology*, 66:1292-1297, 2000.

Lovley, D. et al., Anaerobic Oxidation of Toluene, Phenol, and p-Cresol by the Dissimilatory Iron-Reducing Organism, GS-15, *Applied and Environmental Microbiology*, 56:1858-1864, 1990.

Rabaey, K. et al., A microbial fuel cell capable of converting glucose to electricity at high rate and efficiency, *Biotechnology Letters*, 25:1531-1535, 2003.

Park, H. et al., A Novel Electrochemically Active and Fe(III)-reducing Bacterium Phylogenetically Related to Clostridium butyricum Isolated from a Microbial Fuel Cell, Anaerobe, 7:297-306, 2001.

Park, D. et al., Impact of electrode composition on electricity generation in a single-compartment fuel cell using Shewanella putrefaciens, *Applied Microbiology and Technology*, 59:58-61, 2002.

Raz, S. et al., Supported mixed-gas fuel cells, Solid State Ionics, 149:335-341, 2002.

Reimers, C. et al., Microbial Fuel Cell Energy from an Ocean Cold Seep, Geobiology, 4:123-136, 2006.

Svitil, A. et al., A chitin-binding domain in a marine bacterial chitinase and other microbial chitinases: implications for the ecology and evolution of 1, 4-b-glycanases, Microbiology, 144:1299-1308, 1998.

Lovley, D., et al., Novel Mode of Microbial Energy Metabolism: Organic Carbon Oxidation Coupled to Dissimilatory Reduction of Iron or Manganese, Applied and Environmental Microbiology, 54:1472-1480, 1998.

Allen, R. et al., Microbial fuel-cells: electricity productivity from carbohydrates, Applied biochemistry and biotechnology, 39-40:27-40, 1993.

Logan, B., Extracting Hydrogen and Electricity from Renewable Resources, Environmental Science and Technology, 38:160A-166A, 2004.

Grant, P., Hydrogen lifts off—with a heavy load, Nature, 424:129-130, 2003.

Gross, R. et al., Progress in renewable energy, *Environmental International*, 29:105-122, 2003.

Nath, K. et al., Improvement of fermentative hydrogen production: various approaches, *Applied Microbiology and Biotechnology*, 65:520-529, 2004.

Miyake, J. et al., Biotechnological hydrogen production: research for efficient light energy conversion, *Journal of Biotechnology*, 70:89-101, 1999.

Woodward, J. et al., Enzymatic production of biohydrogen, Nature, 405:1014-1015, 2000.

Cheng, H. et al., Intensification of Water Electrolysis in a Centrifugal Field, Journal of the Electrochemical Society, 149:D172-D177, 2002.

Logan, B. et al., Biological Hydrogen Production Measured in Batch Anaerobic Respirometers, Environmental Science and Technology, 36:2530-2535, 2002.

Min, B. et al., Continuous Electricity Generation from Domestic Wastewater and Organic Substrates in a Flat Plate Microbial Fuel Cell, Environmental Science and Technology, 38:5809-5814, 2004.

Logan, B. et al., Electricity generation from cysteine in a microbial fuel cell, Water Research, 39:942-952, 2005.

Cheng et al., Optimization of Air Cathode used in One-Chamber Microbial Fuel Cells, Proceedings of the 228th American Chemical Society Annual Meeting, 2004.

Angement L. et al., Production of bioenergy in biotechnology from industrial and agricultural wastewater, TRENDS in Biotechnology, 22:477-485, 2004.

He, Z. et al., Electricity Generation from Artificial Wastewater Using an Upflow Microbial Fuel Cell, Environmental Science and Technology, 39:5262-5267, 2005.

Zuo, Y. et al., Tubular Membrane Cathodes for Scalable Power Generation in Microbial Fuel Cells, Environmental Science and Technology, 41:3347-3353, 2007.

Yu, E.H., Cheng, S., Scott, K., Logan, B.E., Microbial fuel performance with non-Pt cathode catalysts, J. Power Sources, 171(2):275-281 (2007).

Cheng, S., Logan, B.E., Sustainable and efficient biohydrogen production via electrohydrogenesis PNAS, 104(47):18871-18873 (2007).

Call, D., Logan, B.E., Hydrogen production in a single chamber microbial electrolysis cell lacking a membrane, Environ. Sci. Technol., 42(9):3401-3406 (2008).

Xing, D., Zuo, Y., Cheng, S., Regan, J.M., Logan, B.E., Electricity generation by *Rhodopseudomonas palustris*, DX-1, Environ. Sci. Technol., in press (2008).

Chen, Weifang, Cannon, Fred S., Rangel-Mendez, Jose R., Ammonia-Tailoring of GAC to enhance perchlorate removal. I: Characterization of $NH_3$ thermally tailored GACs, Carbon 43 (2005) 573-580.

(56) References Cited

OTHER PUBLICATIONS

Chen, Weifang, Cannon, Fred S., Rangel-Mendez, Jose R., Ammonia-tailoring of GAC to enhance perchlorate removal. II: Perchlorate adsorption, Carbon 43 (2005) 581-590.

Min, B., Perchlorate remediation using packed-bed bioreactors and electricity generation in microbial fuel cells (MFCs), Thesis submitted to The Pennsylvannia State University, The Graduate School, Department of Civil and Environmental Engineering, May 2005.

Benemann, J. et al., Novel Photobiological Hydrogen Production Process, *Proceedings of the 13th International Congress on Photosynthesis* (Montreal, Canada) 2004 Eds, Van der Est and Bruce, p. 878-880.

Rezaei, F., Substrate-Enhanced Microbial Fuel Cells for Improved Remote Power Generation from Sediment-Based Systems, *Environment Science & Technology*, 41(11): 4053-58, 2007.

Ditzig, J., Production of hydrogen from domestic wastewater using a bioelectrically assisted microbial reactor (BEAMR), *International Journal of Hydrogen Energy*, 32: 2296-2304, 2007.

Ringeisen, B., A miniature microbial fuel cell operating with an aerobic anode chamber, *Journal of Power Sources*, 165: 591-597, 2007.

Ron, Z., Characterization of the cellulolytic and hydrogen-producing activities of six mesophilic Clostridium species, Journal of Applied Microbiology, 103: 2258-2266, 2007.

Biffinger, J., Engineering Microbial Fuels Cells: Recent Patents and New Directions, Recent Patents on Biotechnology, 2: 150-155, 2008.

Cord-Ruwisch, R., Growth of Geobacter sulfurreducens with Acetate in Syntrophic Cooperation with Hydrogen-Oxidizing Anaerobic Partners, Applied and Environmental Microbiology, 64(6): 2232-2236, Jun. 1998.

Ren, Z., Electricity Production from Cellulose in a Microbial Fuel Cell Using a Defined Binary Culture, Environmental Science & Technology, 41(13): 4781-4786, 2007.

Logan, B.E., Transport of Chemicals Present as Pure Phases, *Transport of Chemicals Present as Pure Phases*, pp. 399-405, 1999.

Dumas, C., et al., Marine microbial fuel cell: Use of Stainless steel electrodes as anode and cathode materials, *Electrochimica Acta*, 53: 468-473, 2007.

Bergel, A., Catalysis of oxygen reduction in PEM fuel cell by seawater biofilm, *Electrochemistry Communications*, 7: 900-904, 2005.

Zuo, Y. et al., Ioin Exchange Membrane Cathodes for Scalable Microbial Fuel Cells, *Environmental Science & Technology*, 42(18): 6967-6972, 2008.

Biniak, et al., Modified porous carbon materials as catalytic support for cathodic reduction of dioxygen, *Fuel Processing Technology* 79: 251-257, 2002.

Olivares-Ramirez, et al., Studies on the hydrogen evolution reaction on different stainless steels, *International Journal of Hydrogen Energy*, 32: 3170-3173, 2007.

Selembo, et al., The use of stainless steel and nickel alloys as low-cost cathodes in microbial electrolysis cells, Journal of Power Sources, 190: 271-278, 2009.

Selembo, et al., Hydrogen production with nickel powder cathode catalysis in microbial electrolysis cells, International Journal of Hydrogen Energy, 35: 428-437, 2010.

Zhang, et al., Microbial fuel cell cathodes with poly(dimethylsiloxane) diffusion layers constructed around stainless steel mesh current collectors, Environmental Science and Technology, 44:1490-1495, 2010.

Zhang, et al. Power generation using an activated carbon and metal cathode in a microbial fuel cell, Electrochemistry Communications, 11:2177-2179, 2009.

Call, et al., High surface area stainless steel brushes as cathodes in microbial electrolysis cells, Environmental Science Technology, 43: 2179-2183, 2009.

Stohr et al., Enhancement of the catalytic activity of activated carbons in oxidation reactions by treatment with ammonia or hydrogen cyanide and observation of a superoxide species as a possible intermediate, Carbon, 29(6): 707-720, 1991.

Park, D. et al., Improved Fuel Cell and Electrode Designs for Producing Electricity from Microbial Degradation, Biotechnology and Bioengineering, 81:348-355, Dec. 3, 2002.

Kim, H. et al., A mediator-less microbial fuel cell using a metal reducing bacterium, *Shewanella putrefaciens*, Enzyme and Microbial Tecchnology, 30:145-152, 2002.

\* cited by examiner

CATHODES FOR MICROBIAL ELECTROLYSIS CELLS AND MICROBIAL FUEL CELLS

REFERENCE TO RELATED APPLICATIONS

This application is a continuation of U.S. patent application Ser. No. 12/649,945, filed Dec. 30, 2009, which claims priority from U.S. Provisional Patent Application Ser. No. 61/141,511, filed Dec. 30, 2008.

U.S. patent application Ser. No. 12/649,945 is also a continuation-in-part of U.S. patent application Ser. No. 12/145,722, filed Jun. 25, 2008, now U.S. Pat. No. 7,922,878, which claims priority from U.S. Provisional Patent Application Ser. No. 60/945,991, filed Jun. 25, 2007. U.S. patent application Ser. No. 12/145,722 is also a continuation-in-part of U.S. patent application Ser. No. 11/180,454, filed Jul. 13, 2005, now U.S. Pat. No. 7,491,453, which claims priority from U.S. Provisional Patent Application Ser. Nos. 60/588,022, filed Jul. 14, 2004 and 60/608,703, filed Sep. 10, 2004. U.S. patent application Ser. No. 12/145,722 is also a continuation-in-part of U.S. patent application Ser. No. 11/799,194, filed May 1, 2007, now U.S. Pat. No. 8,962,165, which claims priority from U.S. Provisional Patent Application Ser. No. 60/796,761, filed May 2, 2006.

U.S. patent application Ser. No. 12/649,945 is also a continuation-in-part of U.S. patent application Ser. No. 12/177,962, filed Jul. 23, 2008, now abandoned, which claims priority of U.S. Provisional Patent Application Ser. No. 60/951,303, filed Jul. 23, 2007. U.S. patent application Ser. No. 12/177,962 also a continuation-in-part of U.S. patent application Ser. No. 11/799,194, filed May 1, 2007, now U.S. Pat. No. 8,962,165, which claims priority from U.S. Provisional Patent Application Ser. No. 60/796,761, filed May 2, 2006.

U.S. patent application Ser. No. 12/649,945 is also a continuation-in-part of U.S. patent application Ser. No. 11/799,149, filed May 1, 2007, now U.S. Pat. No. 8,277,984, which claims priority of U.S. Provisional Patent Application 60/796,761, filed May 2, 2006.

The entire content of each application is incorporated herein by reference.

GOVERNMENT SUPPORT

This invention was made with government support under Contract No. CBET-0730359 awarded by the National Science Foundation. The government has certain rights in this invention.

FIELD OF THE INVENTION

The invention relates to cathodes used in microbial fuel cells (MFCs), which are used for producing electricity; and microbial electrolysis cells (MECs), which are used to produce hydrogen.

SUMMARY OF THE INVENTION

An apparatus is provided according to embodiments of the present invention which includes a reaction chamber having a wall defining an interior of the reaction chamber and an exterior of the reaction chamber, exoelectrogenic bacteria disposed in the interior of the reaction chamber an aqueous medium having a pH in the range of 3-9, inclusive, the aqueous medium including an organic substrate oxidizable by exoelectrogenic bacteria and the medium disposed in the interior of the reaction chamber. An inventive apparatus further includes an anode at least partially contained within the interior of the reaction chamber; and a brush or mesh cathode including stainless steel, nickel or titanium, the cathode at least partially contained within the interior of the reaction chamber.

Optionally, an inventive apparatus further includes a brush or mesh cathode consisting essentially of stainless steel, nickel or titanium.

Stainless steels included in a cathode of the present invention can be any stainless steel, such as Austenitic, Ferritic or Martensitic stainless steel. Non-limiting examples of included stainless steels are SS 304, SS 316, SS 420 and SS 286.

Nickel included in a cathode of the present invention can be any nickel. Non-limiting examples of included nickels are Ni 201, Ni 400, Ni 625 and Ni HX. Titanium included in a cathode of the present invention can be any titanium.

In particular embodiments, a cathode included in an inventive apparatus has, in operation, a solution facing portion and a gas facing portion, and PTFE is excluded from the gas facing portion.

In preferred embodiments, microbes are substantially excluded from contact with the cathode.

In certain embodiments, no exogenous noble metal catalyst is present in the cathode.

In further embodiments, a catalyst is present in the cathode. A catalyst such as nickel, platinum, activated carbon, or CoTMPP is present in particular embodiments of cathodes of the present invention. A nickel oxide catalyst is present in particular embodiments of cathodes of the present invention.

In still further embodiments, a nickel oxide catalyst included in a cathode of the present invention is electrodeposited on a stainless steel, nickel or titanium brush or mesh.

An apparatus according to embodiments of the present invention includes a cathode which is generally tubular in shape, having a wall defining an interior space, an interior wall surface, an exterior, and an exterior wall surface, wherein the wall comprises a stainless steel, nickel or titanium mesh, the mesh having a first mesh surface disposed towards the interior space and a second mesh surface disposed towards the exterior. A generally tubular cathode can have a cross section of various shapes such as circular, oval, oblong, square and rectangular.

Optionally, the mesh has a first mesh surface and a second mesh surface and a coating is present on the first mesh surface, the second mesh surface or both the first mesh surface and the second mesh surface. For example, an included coating is a diffusion layer or a cathode protection layer.

In particular embodiments, the second mesh surface is disposed towards the exterior of the tubular cathode or is exposed to the exterior of the reactor and the coating on the second mesh surface is a water impermeable coating.

In particular embodiments, the second mesh surface is disposed towards the exterior of the tubular cathode or the exterior of the reactor and the coating on the second mesh surface is an oxygen impermeable coating.

In particular embodiments, the second mesh surface is disposed towards the exterior of the reactor and the coating on the second mesh surface is an oxygen permeable coating.

Optionally, the coating on the first mesh surface, second mesh surface or both the first mesh surface and second mesh surface includes an electron conductive binder.

In a further option the coating on the first mesh surface, second mesh surface or both the first mesh surface and second mesh surface includes a catalyst.

A microbial electrolysis apparatus according to embodiments of the present invention includes a power source operably connected to add voltage to enhance an electrical potential between the anode and cathode.

A microbial electrolysis apparatus according to embodiments of the present invention includes a hydrogen fuel cell power source operably connected to add voltage to enhance an electrical potential between the anode and cathode, wherein the hydrogen fuel cell power source is at least partially fuelled by the microbial electrolysis apparatus.

Biological processes for producing hydrogen or electric current are provided according to embodiments of the present invention which include providing an apparatus which includes a reaction chamber having a wall defining an interior of the reaction chamber and an exterior of the reaction chamber, exoelectrogenic bacteria disposed in the interior of the reaction chamber; an aqueous medium having a pH in the range of 3-9, inclusive, the aqueous medium including an organic substrate oxidizable by exoelectrogenic bacteria and the medium disposed in the interior of the reaction chamber, wherein the apparatus further includes an anode at least partially contained within the interior of the reaction chamber and a brush or mesh cathode including stainless steel, nickel or titanium, the cathode at least partially contained within the interior of the reaction chamber; and maintaining oxidizing reaction conditions such that electrons are produced by oxidation of the organic substrate by the electrogenic bacteria and the electrons are transferred to an anode.

Embodiments of a biological process for producing hydrogen further include application of a voltage in the range of 25-1000 millivolts, enhancing an electrical potential between the anode and cathode.

BACKGROUND OF THE INVENTION

Both electricity and hydrogen production result from the degradation of organic matter by microbes, such as exoelectrogenic bacteria. Microbes oxidize organic matter, releasing electrons to a circuit and protons into solution. In an MFC at the cathode, the electrons and protons combine with oxygen to form water. To make hydrogen in an MEC, the MFC is modified by excluding oxygen and adding a small additional voltage. Electrons and protons combine on the cathode in the MEC to form hydrogen gas. MFCs and MECs can be used in various applications, such as a method of wastewater treatment, or as a method for renewable energy production, for example. Examples of MFCs for making electricity are exemplified in Liu and Logan (2004) and Liu et al. (2004). Examples of MECs are given by Liu et al. (2005), Cheng and Logan (2007c), and Call and Logan (2008).

Performance of current MECs and MFCs can be limited by the cathode and current cathodes require expensive materials, such as platinum. Thus, improved cathodes for MECs and MFCs are required.

DETAILED DESCRIPTION OF THE INVENTION

Microbial fuel cells according to the present invention are provided which are configured to produce electricity (MFC) and/or hydrogen (MEC) in particular embodiments. An MFC or MEC of the present invention includes at least one anode, at least one cathode, a reaction chamber in which an anode and cathode are at least partially disposed, and a conductive conduit for electrons in electrical communication with the anode and the cathode. In the case of an MEC, a power source for enhancing an electrical potential between the anode and cathode is further included.

A reaction chamber may have one or more compartments, such as an anode compartment and a cathode compartment separated, for instance, by a cation or anion exchange membrane or other separator. Alternatively, a reaction chamber may be a single compartment configuration with no separator present between the anode and cathode. One or more channels may be included in a reaction chamber for addition and removal of various substances such as substrates for bacterial metabolism and products such as hydrogen.

In an MFC, oxygen is present at the cathode to facilitate the reaction of protons, electrons and oxygen to form water. In an MEC, oxygen is substantially excluded from the cathode area and a power source for enhancing an electrical potential between the anode and cathode by application of a voltage is included.

Figure 1:
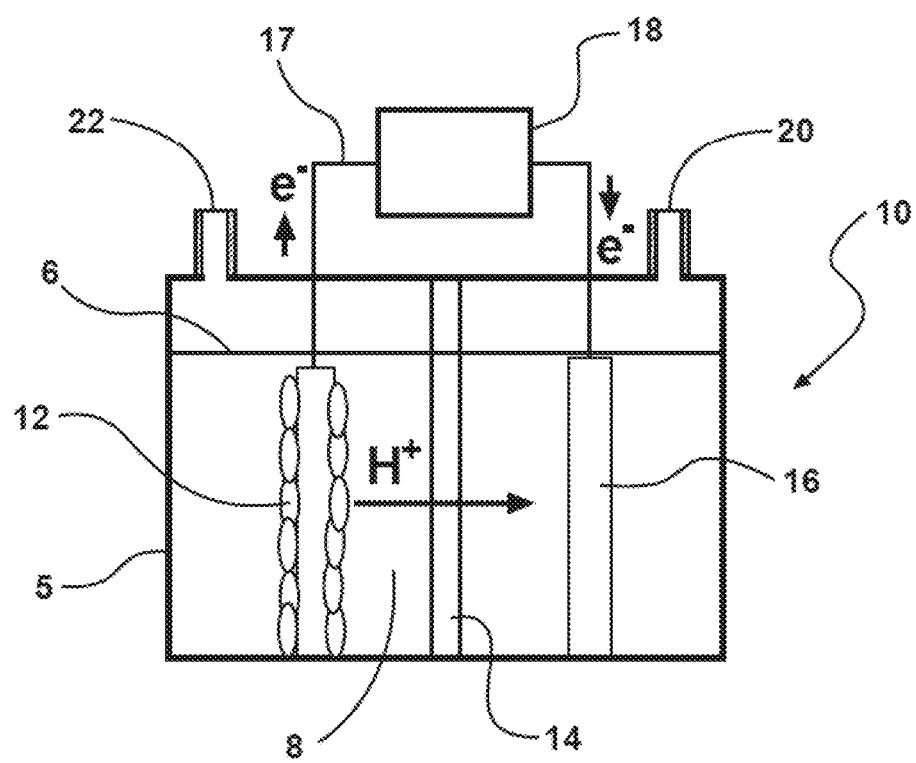
FIG. 1 illustrates an embodiment of an inventive MEC or MFC system.

FIG. 1 illustrates an embodiment of an inventive MEC or MFC at 10. In this illustration, a reaction chamber is shown having a wall 5 defining an interior and exterior of the reaction chamber, and fluid, such as an aqueous solution containing a biodegradable substrate, in the interior of the reaction chamber, the fluid level shown at 6. An anode having bacteria disposed thereon is shown at 12 and a cathode is shown at 16. A space 8 between the electrodes is further depicted. Space 8 is minimized to improve system performance and is generally in the range of 0.1-100 cm, inclusive. An optional separator, such as a proton exchange membrane (PEM) or filter separator, is shown at 14 positioned between the anode 12 and cathode 16. A conduit for electrons 17 is shown along with a connected power source (MEC) or load (MFC) shown at 18. Channels 20 and 22 are shown which can serve as flow paths for materials entering or leaving the reaction chamber.

Cathodes

The present invention provides cathodes for MFCs and MECs that provide good performance for these systems.

In embodiments of the present invention, cathodes are characterized by high specific surface area.

In particular embodiments, an inventive cathode has a specific surface area greater than 10 $m^2/m^3$. Specific surface area is here described as the total surface area of the cathode per unit of cathode volume. In further embodiments, a cathode of the present invention has a specific surface area greater than 1000 $m^2/m^3$. In still further embodiments, a cathode of the present invention has a specific surface area greater than 5,000 $m^2/m^3$. In yet further embodiments, a cathode of the present invention has a specific surface area greater than 10,000 $m^2/m^3$.

Exemplary high surface area cathodes of the present invention include metal brush cathodes and metal mesh cathodes, where the metal is stainless steel, nickel or titanium. A nickel brush or mesh cathode can be nickel metal or a nickel alloy. The term "nickel" is used herein to refer to nickel metal and nickel alloys unless otherwise specified. A titanium brush or mesh cathode can be titanium metal or a titanium alloy. The term "titanium" is used herein to refer to titanium metal and titanium alloys unless otherwise specified.

A metal brush cathode includes one or more conductive fibers. In particular embodiments the one or more fibers are attached to a support. A plurality of fibers is attached to the support and the fibers extend generally radially from the support in specific embodiments. A brush electrode optionally includes a centrally disposed support having a longitudinal axis.

Brush electrodes include a variety of configurations illustratively including various twisted wire brush configurations and strip brush configurations. For example, a particular twisted wire brush configuration includes a support formed from two or more strands of wire and fibers attached between the wires. In a further example, a strip brush configuration includes fibers attached to a conductive backing strip, the strip attached to the support.

Fibers of a brush cathode are electrically conductive and are in electrical communication with the support and with an anode.

Various U.S. standard mesh sizes having pore sizes of about one centimeter or less, for example U.S. standard 7/16 inch mesh, ¼ inch mesh, and U.S. standard mesh Nos. 4, 5, 6, 7, 8, 10, 12, 14, 16, 18, 20, 25, 30, 35, 40, 42, 44, 50, 54, 60, 70, 90, 120, 140, 165, 200, 325, 400 and 500 mesh, are included in cathodes for use in MECs and MFCs according to particular embodiments. Mesh sizes are known in the art and particular mesh dimensions are illustrated below:

| mesh # | 42 | 44 | 50 | 60 | 80 | 80 | 90 | 120 | 165 | 500 |
|---|---|---|---|---|---|---|---|---|---|---|
| wire diameter(inch) | 0.0055 | 0.0055 | 0.0055 | 0.0075 | 0.0037 | 0.0055 | 0.0055 | 0.004 | 0.0019 | 0.001 |
| pore size(inch) | 0.018 | 0.0172 | 0.0145 | 0.009 | 0.0088 | 0.007 | 0.006 | 0.0043 | 0.0042 | 0.001 |
| Calculated Surface Area(cm$^2$) | 11.20 | 11.90 | 13.75 | 17.63 | 22.21 | 23.60 | 27.90 | 35.87 | 46.42 | 151.15 |
| area per area(cm$^2$/cm$^2$) | 1.60 | 1.70 | 1.96 | 2.52 | 3.17 | 3.37 | 3.99 | 5.12 | 6.63 | 21.59 |
| area per volume(cm$^2$/cm$^3$) | 114.53 | 121.69 | 140.61 | 132.21 | 337.62 | 241.33 | 285.31 | 504.36 | 1374.05 | 8501.15 |
| area per reactor volume(cm$^2$/cm$^3$) | 0.37 | 0.40 | 0.46 | 0.59 | 0.74 | 0.79 | 0.93 | 1.20 | 1.55 | 5.04 |
| Measured Surface Area (cm$^2$) | 12.23 | 12.35 | 13.63 | 19.79 | 15.03 | 17.11 | 16.96 | 23.26 | 18.45 | 15.54 |
| area per area(cm$^2$/cm$^2$) | 1.75 | 1.76 | 1.95 | 2.83 | 2.15 | 2.44 | 2.42 | 3.32 | 2.64 | 2.22 |
| area per volume(cm$^2$/cm$^3$) | 125.06 | 126.32 | 139.37 | 148.37 | 228.46 | 174.95 | 173.48 | 327.12 | 546.06 | 874.25 |
| area per reactor volume(cm$^2$/cm$^3$) | 0.41 | 0.41 | 0.45 | 0.66 | 0.50 | 0.57 | 0.57 | 0.78 | 0.61 | 0.52 |

*projected electrode area = 7 cm$^2$
*reactor volume for calculation = 30 cm$^3$ Metal brush cathodes according to embodiments of the present invention include stainless steel, nickel or titanium fibers attached to a stainless steel, nickel or titanium support.

Figure 2:
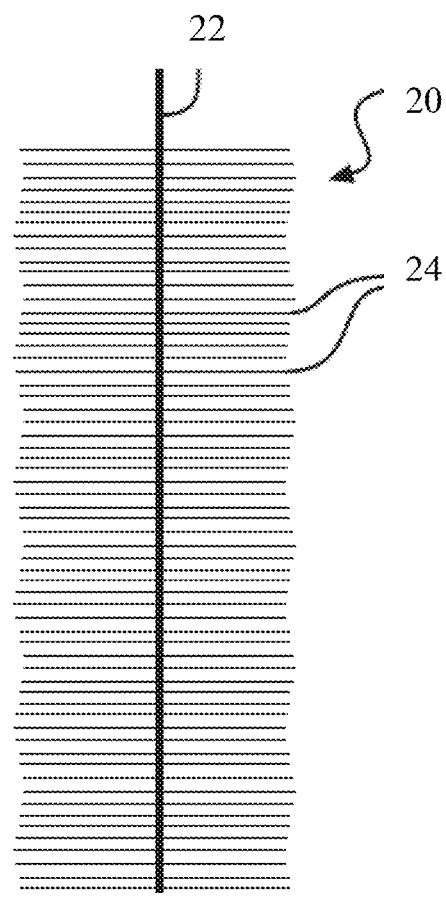
FIG. 2 illustrates a brush cathode having stainless steel, nickel or titanium bristles included in embodiments of an MEC or MFC.

FIG. 2 illustrates a high specific surface area stainless steel, nickel or titanium brush cathode included in embodiments of an MEC or MFC of the present invention. FIG. 2 shows a configuration of a brush cathode 20 in which stainless steel, nickel or titanium bristles 24 are placed substantially perpendicular to and between two or more conductive, corrosion resistant wires which form a support 22 such that the bristles 24 extend substantially radially from the support 22. A wire is optionally twisted around the brushes to maintain good electrical contact with the wire. A conductive connector is typically attached to the support 22 to electrically connect the cathode to the anode.

Brush cathode configurations can include multiple discontinuous bristles and/or one or more continuous wires wound about a central axis, forming looped bristles. Where no support is included, a conductive connector is attached to the wire or wires forming the bristles to electrically connect the cathode anode to the anode. Where a support is included, a conductive connector is typically attached to the support to electrically connect the cathode and an anode. Bristles of a brush cathode can be randomly or non-randomly oriented.

Optionally, a brush cathode includes bristles that extend substantially radially from a central axis forming a cylindrical brush. In a further option, bristles extend substantially radially from a central axis forming a partial cylindrical shape, such as a half cylinder or quarter cylinder. A half cylindrical brush cathode is preferred in particular MEC and MFC embodiments.

A brush cathode optionally includes one or more coatings.

Metal mesh cathodes according to embodiments of the present invention include a stainless steel, nickel or titanium mesh.

For example, 42 mesh with a wire diameter of 0.0055 inches or 13.97 mm has an open area of 59.1%, and an opening width of 0.018 inches. Specific surface area of the mesh is estimated for 42 mesh at about 11,000 m$^2$/m$^3$ based on the volume defined by the thickness of the mesh and the geometric surface area of a wire.

In preferred MEC embodiments, the pore size of the stainless steel, nickel or titanium mesh is in the range of 0.005-0.02 inch, inclusive. In preferred MFC embodiments, the pore size of the stainless steel, nickel or titanium mesh is in the range of 0.005-0.4 inch, inclusive.

Figure 3:
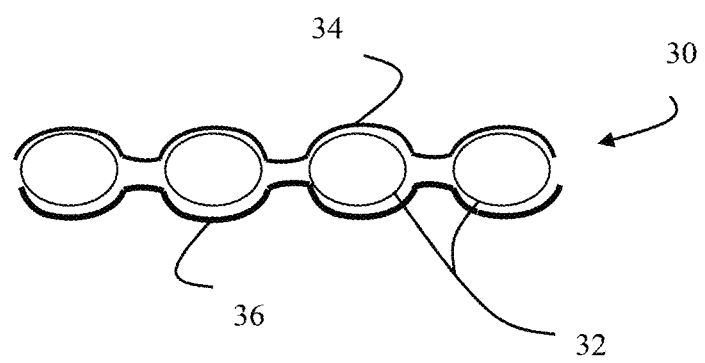
FIG. 3 illustrates a cross sectional view of an embodiment of a stainless steel, nickel or titanium mesh cathode.

FIG. 3 illustrates a cross sectional view of an embodiment of a stainless steel, nickel or titanium mesh cathode 30. Wires 32 of the mesh are shown along with an optional first coating 34 on one side of the mesh and an optional second coating 36 on the opposing side of the mesh.

A stainless steel, nickel or titanium mesh included in a cathode according to embodiments of the present invention can be shaped to increase surface area. For example, the mesh may be pleated to achieve an accordion fold.

In preferred embodiments, the mesh forms a wall defining an interior space. In further preferred embodiments, the interior space is open to the exterior of the reactor or to a gas space in the reactor at one or both ends. Thus, cathodes according to embodiments of the present invention can be generally tubular in shape, having a wall defining an interior space, an interior wall surface, an exterior, and an exterior wall surface. Such generally tubular cathodes have any of various cross sectional shapes, including, but not limited to, circular, oblong, square or rectangular. In an MFC, an inventive tubular cathode is configured so that air is present inside the tube, and water outside the tube. In an MEC, an inventive tubular cathode is configured to separate hydrogen produced from liquid in the reactor where the tube may contain only gas, or may contain an aqueous medium similar or different from that in the reactor. For example, the interior space defined by the wall of the tubular cathode may contain liquid having a lower or higher pH than the solution containing the bacteria in order to protect the bacteria from the extreme pH environment of the tubular solution. The interior of tubular cathodes of MFCs or MECs may be flushed with solutions or gases to clean or maintain them.

Figure 4:
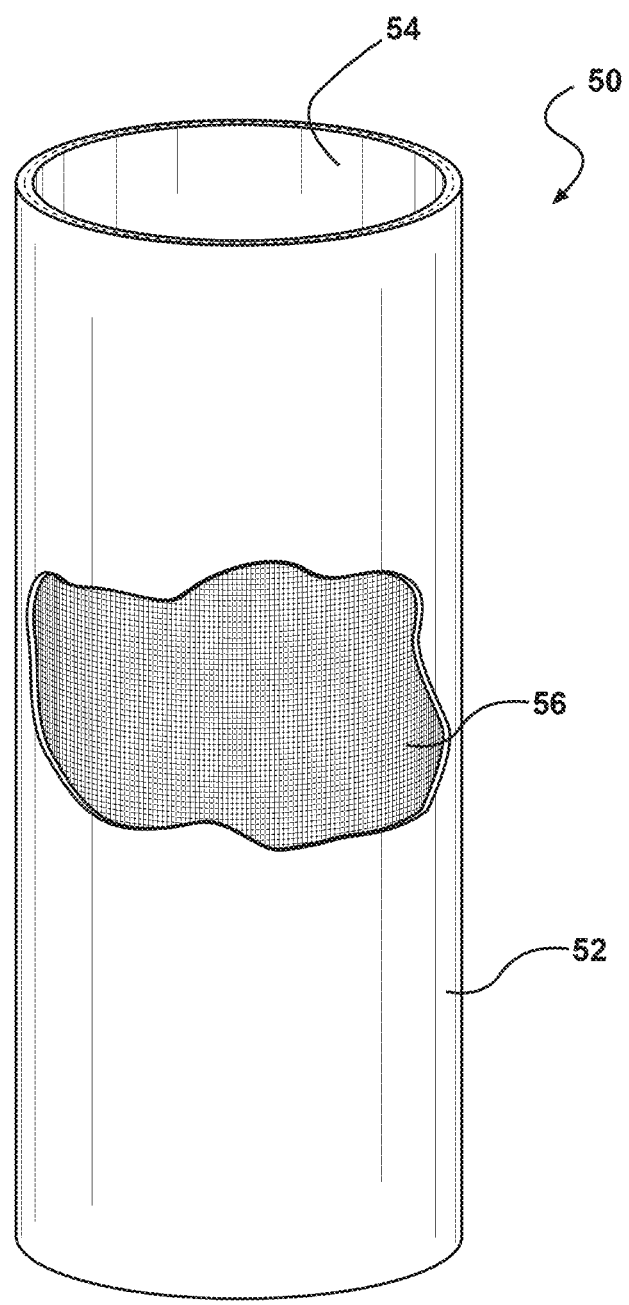
FIG. 4 illustrates a tubular embodiment of a stainless steel, nickel or titanium mesh cathode.

FIG. 4 shows a tubular embodiment of a mesh cathode 50. Illustrated is an optional coating 52 on the side of the mesh disposed toward the exterior of the cathode and an optional coating 54 on the side of the mesh disposed toward the interior of the cathode. The mesh is shown at 56.

Cathode Coatings

In a further option, a cathode of the present invention may include one or more coatings on one or more cathode surfaces. In particular embodiments, one or more coatings are included on an inner cathode surface, that is, a cathode surface present in the interior volume of the reaction chamber, and/or an outer surface, that is, a cathode surface exterior to the reaction chamber. A cathode surface exterior to the reaction chamber is likely to be present where a gas cathode is used, where the exterior cathode surface is in contact with a gas.

In further embodiments, one or more coatings are included on an interior wall surface of a tubular cathode and/or an exterior wall surface of a tubular cathode.

Exemplary coatings are functionalized to inhibit or allow passage of a selected substance, such as water and/or oxygen, through the wall.

A coating may include a binder, such as an electron or proton conductive binder.

One or more coatings may be added to act as cathode protection layers or diffusion layers, for example.

A cathode optionally contains one or more cathode shielding materials. Such a shielding material may preferably include a layer of a shielding material disposed on any cathode surface, including an inner cathode surface, that is, a cathode surface present in the interior volume of the reaction chamber, and an outer surface, that is, a cathode surface exterior to the reaction chamber. A cathode surface exterior to the reaction chamber is likely to be present where a gas cathode is used, where the exterior cathode surface is in contact with a gas.

A cathode protective layer, for instance, may be used to prevent contact of microbes or other materials with the cathode surface in both electrode assemblies for current producing systems and for hydrogen gas generation systems. A cathode protection layer for a current producing microbial fuel cell system can be used as a support for microbes such as bacterial colonization wherein bacteria scavenge oxygen in the vicinity of the cathode so it does not leak into the reactor and it may not directly contact the anode.

Thus, in particular embodiments, an inner cathode surface is protected by a cathode protection layer (CPL). A function of the CPL is to protect the cathode from biofouling of the catalyst. Further, a CPL reduces diffusion of carbon dioxide to the cathode so as to limit methane formation from both abiotic and biotic sources, or from the action of bacteria, at the cathode. In embodiments of an inventive system, a CPL is configured such that it is in contact with an inner surface of a cathode. Thus, for instance, a CPL may be configured to cover the inner surface of the cathode partially or wholly, such as by bonding of the CPL to the cathode.

The cathode protection layer may contain chemicals or metals that interfere with bacterial adhesion to the cathode, for example silver particles or cationic surfactants.

Optionally, in a further embodiment, a CPL is present in the interior of an MFC or MEC reaction chamber but not in contact with the cathode. The inclusion of such a CPL defines two or more regions of such a reactor based on the presence of the CPL. The CPL can be proton, liquid, and/or gas permeable barriers, such as a filter. For example, a filter for inhibiting introduction of large particulate matter into the reactor may be positioned between the anode and cathode such that material flowing through the reaction chamber between the anode and cathode passes through the filter. Alternatively or in addition, a filter may be placed onto the cathode, restricting the passage of bacteria-sized particles to the cathode. Further, a filter may be positioned between an inlet channel and/or outlet channel and the interior of the reaction chamber or a portion thereof. Suitable filters may be configured to exclude particles larger than 0.01 micron-1 micron for example. In particular embodiments, a CPL includes a "proton diffusion layer" for selectively allowing passage of material to the vicinity of a cathode. In one embodiment, a diffusion layer includes an ion exchange material. Any suitable ion conducting material which conducts protons may be included in a proton exchange membrane. For example, a perfluorinated sulfonic acid polymer membrane may be used. In particular, a proton exchange membrane such as NAFION, that conducts protons, may be used for this purpose. A further example of an ion conducting material is polyphenyl sulfone, available commercially as RADEL R.

In particular embodiments of the present invention, a diffusion layer includes an anion exchange material. For example, the diffusion layer includes an anion exchange material that conducts anions, associated with protons produced by anodophilic bacteria, to the cathode, such as a quaternary amine styrene divinylbenzene copolymer. An included diffusion layer further functions to inhibit diffusion of gas to or from a cathode relative to the anode chamber. Without wishing to be bound by theory it is believed that the protons associated with the negatively charged, anionic, ion exchange groups, such as phosphate groups, specifically allow passage of negatively charged anions that contain positively charged protons but overall carry a net negative charge, and not allowing passage of positively charged ions and reducing the diffusion of hydrogen into the anode chamber. Such a diffusion layer allows for efficient conduction of protons across the barrier while inhibiting backpassage of hydrogen. An example of such a diffusion layer material is the anion exchange membrane AMI-7001, commercially supplied by Membranes International, Glen Rock, N.J. In addition to membrane form, the diffusion layer can also include an anion conducting material applied as a paste directly to a cathode. For example, an anion exchange material can be used to contain a catalyst applied to a cathode.

A diffusion layer for an electrode assembly for a current producing microbial fuel cell system can be configured to allow oxygen diffusion to the catalyst from the air-facing side into the conductive electrode matrix, and to reduce oxygen diffusion into the system.

An exemplary diffusion layer coated on the air-facing side of a gas cathode is a carbon/PTFE layer or one or more additional PTFE diffusion layers. The carbon/PTFE base layer can be prepared by applying a mixture of carbon powder (Vulcan XC-72) and 30 wt % PTFE solution (20 µl/mg of carbon powder) onto one side of the carbon cloth, air-drying at room temperature for 2 h, followed by heating at 370° C. for 0.5 h. The carbon loading in an exemplary diffusion layer is 2.5 mg $cm^2$.

In certain MFC cathode embodiments, a oxygen permeable cathode diffusion layer is included which contains a viscoelastic polymer. In particular embodiments, the viscoelastic polymer is an organosilicon compound, particularly a siloxane polymer. Poly(dimethylsiloxane) (PDMS) is a preferred siloxane polymer included in a diffusion layer of an inventive cathode according to certain embodiments. Poly(1-trimethylsilyl-1-propyne) [PTMSP] is a further example of a preferred siloxane polymer included in a diffusion layer of an inventive cathode according to certain embodiments.

In preferred embodiments, an included viscoelastic polymer is cured at temperatures of 40° C. or less.

Oxygen permeable thermoplastics, such as crosslinked poly(butadiene) are included in an MFC cathode diffusion layer according to particular embodiments of the present invention.

In further preferred MFC cathode embodiments, PTFE is excluded from the cathode diffusion layer.

In preferred MFC cathode embodiments, an oxygen permeable cathode diffusion layer includes conductive carbon and a viscoelastic polymer. Conductive carbon includes in an oxygen permeable cathode diffusion layer illustratively includes graphite, carbon nanoparticles such as carbon nanotubes and carbon black.

The amount of each component and the thickness of the cathode diffusion layer is adjusted for a particular cathode and MFC configuration to achieve the desired oxygen diffusion under given operating conditions. In particular embodiments, a cathode diffusion layer includes viscoelestic polymer in amounts of $1 \times 10^{-2}$-$1 \times 10^{-4}$ mg/cm$^2$, inclusive, of mesh and conductive carbon in amounts of 0.1-10 mg/cm$^2$, inclusive, of mesh, although more or less of each component can be used.

In preferred MFC and MEC cathode embodiments, microorganisms are excluded from the cathode or are present only in amounts which produce no detectable effect on MFC or MEC performance.

In particular embodiments, an outer surface of a cathode is covered partially or preferably wholly by a cathode diffusion layer (CDL). The CDL may be directly exposed to the gas phase and inhibits water leakage through the cathode from the interior of the reaction chamber.

Further, in MEC embodiments, a CDL is hydrogen permeable, allowing hydrogen to freely diffuse from the catalyst in the cathode into a gas collection chamber, gas conduit or other component of a gas collection system, such as may be present in an MEC. A CDL may further provide support for the cathode and may further form a portion of a wall of a reaction chamber. A CDL can also help to reduce bacteria from reaching the cathode and fouling the surface. A CDL includes a hydrogen permeable hydrophobic polymer material such as polytetrafluoroethylene (PTFE) or like materials. The thickness of this material can be varied or multiple layers can be applied depending on the need to reduce water leakage.

Cathodes according to embodiments of the present invention include a metal mesh and a conductive coating, for example carbon black in a binder of Nafion or PTFE in contact with the metal mesh. Additional layers can be placed onto this structure, for example, a PTFE diffusion layer on the air side to inhibit water permeability and to reduce oxygen diffusion through the cathode and into the water.

Cathode Catalyst

In some MEC embodiments, stainless steel serves as the sole cathode catalyst. In particular MEC embodiments, the cathode consists essentially of stainless steel, nickel or titanium in brush or mesh form. Combinations of stainless steel, nickel and titanium can be used.

In some embodiments, stainless steel cathode catalysis is enhanced through the use of steels that have a nickel content of at least 5% by weight. In further embodiments, the performance of stainless steel cathode catalysis is enhanced through the use of steels that have a nickel content of at least 8% by weight. In still further embodiments, the performance of stainless steel cathode catalysis is enhanced through the use of steels that have a nickel content of at least 15% by weight. In yet further embodiments, the performance of stainless steel cathode catalysis is enhanced through the use of steels that have a nickel content of at least 20% by weight.

Optionally, a cathode described herein includes an added catalyst, such as, but not limited to, a nickel or platinum catalyst. A non-precious metal catalyst such as cobalt tetramethoxyphenylporphyrin (CoTMPP) can be included.

In a preferred option, an added nickel catalyst is a nickel oxide catalyst. For example, one or more nickel oxides is deposited on a stainless steel and/or nickel cathode by electrochemical deposition in order to increase catalytic efficiency.

Activated carbon is an included catalyst in preferred embodiments of inventive cathodes.

An included catalyst can be integrated with a cathode by methods including, but not limited to electrodeposition, a chemical reaction, and chemical precipitation. A catalyst can be included in a cathode coating.

In preferred embodiments, no noble metal catalyst is added to a cathode of the present invention. While small amounts of noble metals may be present as impurities in stainless steel, nickel or titanium used, no noble metal exogenous to the stainless steel, nickel or titanium is present in preferred embodiments of an inventive cathode. Noble metals typically included as cathode catalysts are platinum and palladium. Thus, in preferred embodiments, no platinum or palladium is added to a cathode of the present invention. In further preferred embodiments, substantially no platinum or palladium is present in a cathode of the present invention. The term "substantially no platinum or palladium" refers to an undetectable or catalytically negligible amount of platinum or palladium. For example, where platinum or palladium are undetectable by multi-channel atomic emission spectrometry or is present in amounts of 0.01% by weight or less, it is considered that substantially no platinum or palladium is present in a cathode of the present invention.

Anodes

An anode in embodiments of MFCs an MECs of the present invention includes a conductive and corrosion-resistant or non-corroding material, for example carbon paper or cloth, carbon foam, graphite rods, blocks or fibers either in random bundles or arranged in brush form (*Logan*, 2008; *Logan*, et al., 2007b). An anode material can be treated to make bacteria more easily adhere to the surface. In addition, an anode is optionally treated to increase current densities, for example by using a high-temperature ammonia gas treatment as described herein.

Optionally, an anode included in an MFC or MEC is characterized by high specific surface area, for instance as described in U.S. patent application Ser. Nos. 11/799,194 and 12/145,722.

In preferred embodiments, an anode included in embodiments of MECs and MFCs of the present invention is a brush having graphite fiber bristles in electrical contact with a conductive core.

Electrode Assemblies

An anode and cathode may have any of various shapes and dimensions and are positioned in various ways in relation to each other. In one embodiment, the anode and the cathode each have a longest dimension, and the anode and the cathode are positioned such that the longest dimension of the anode is parallel to the longest dimension of the cathode. In another option, the anode and the cathode each have a longest dimension, and the anode and the cathode are positioned such that the longest dimension of the anode is perpendicular to the longest dimension of the cathode. Further optionally, the anode and the cathode each have a longest dimension, and the anode and the cathode are positioned such that the longest dimension of the anode is perpendicular to the longest dimension of the cathode. In addition, the anode and the cathode may be positioned such that the longest dimension of the anode is at an angle in the range between 0 and 180 degrees with respect to the longest dimension of the cathode.

Space between an anode and cathode is minimized to improve system performance and is generally in the range of 0.1-100 cm, inclusive.

Optionally, an inventive system is provided which includes more than one anode and/or more than one cathode. For example, from 1-100 additional anodes and/or cathodes may be provided. The number and placement of one or more anodes and/or one or more electrodes may be considered in the context of the particular application. For example, in a particular embodiment where a large volume of substrate is to be metabolized by microbial organisms in a reactor, a larger area of anodic surface may be provided. Similarly, a larger area of cathode surface may be appropriate. In one embodiment, an electrode surface area is provided by configuring a reactor to include one or more electrodes that project into the reaction chamber. In a further embodiment, an electrode surface area is provided by configuring the cathode as a wall of the reactor, or a portion of the wall of the reactor. The ratio of the total surface area of the one or more anodes to the total volume of the interior of the reaction chamber is in the range of about 10000:1-1:1, inclusive, square meters per cubic meter in particular embodiments. In further embodiments, the ratio is in the range of about 5000:1-100:1.

In general, an anode has a surface having a surface area present in the reaction chamber and the cathode has a surface having a surface area in the reaction chamber. In one embodiment, a ratio of the total surface area of anodes to surface area of cathodes in an inventive system is about 1:1. In one embodiment, the anode surface area in the reaction chamber is greater than the cathode surface area in the reaction chamber. This arrangement has numerous advantages such as lower cost where a cathode material is expensive, such as where a platinum catalyst is included. In addition, a larger anode surface is typically advantageous to provide a growth surface for exoelectrogens to transfer electrons to the anode. In a further preferred option a ratio of the anode surface area in the reaction chamber to the cathode surface area in the reaction chamber is in the range of 1.5:1-1000:1 and more preferably 2:1-10:1.

The ratio of the total surface area of the one or more cathodes to the total volume of the interior of the reaction chamber is in the range of about 10000:1-1:1, inclusive, square meters per cubic meter in particular embodiments. In further embodiments, the ratio is in the range of about 1000:1-10:1. The total surface area of the cathodes described here is exclusive of the surface area of any catalyst included in the cathode.

System Configurations and Components

A power source for enhancing an electrical potential between the anode and cathode is included in MECs of the present invention. Power sources used for enhancing an electrical potential between the anode and cathode are not limited and illustratively include grid power, solar power sources, wind power sources. Further examples of a power source suitable for use in an inventive system illustratively include a DC power source and an electrochemical cell such as a battery or capacitor.

In a particular embodiment, a power supply for an MEC is an MFC.

In a particular embodiment, a portion of the hydrogen generated in an MEC of the present invention is used to power a hydrogen fuel cell, the hydrogen fuel cell serving as a power source for the MEC.

An ion exchange membrane is optionally disposed between an anode and a cathode in embodiments of the present invention.

An MEC or MFC according to the present invention may be configured as a self-contained system in particular embodiments. Thus, for example, a quantity of a biodegradable substrate is included in the reactor and no additional substrate is added. In further options, additional substrate is added at intervals or continuously such that the system operates as a batch processor or as a continuous flow system.

A hydrogen gas collection system is optionally included in an inventive MEC such that the hydrogen gas generated is collected and may be stored for use, or directed to a point of use, such as to a hydrogen fuel powered device. For example, a hydrogen gas collection unit may include one or more hydrogen gas conduits for directing a flow of hydrogen gas from the cathode to a storage container or directly to a point of use. A hydrogen gas conduit is optionally connected to a source of a sweep gas. For instance, as hydrogen gas is initially produced, a sweep gas may be introduced into a hydrogen gas conduit, flowing in the direction of a storage container or point of hydrogen gas use. For instance, a hydrogen collection system may include a container for collection of hydrogen from the cathode. A collection system may further include a conduit for passage of hydrogen. The conduit and/or container may be in gas flow communication with a channel provided for outflow of hydrogen gas from the reaction chamber. Typically, the conduit and/or container are in gas flow communication with the cathode, particularly where the cathode is a gas cathode.

A channel is included defining a passage from the exterior of the reaction chamber to the interior in particular embodiments. More than one channel may be included to allow and/or regulate flow of materials into and out of the reaction chamber. For example, a channel may be included to allow for outflow of a gas generated at the cathode. Further, a channel may be included to allow for outflow of a gas generated at the anode.

In a particular embodiment of a continuous flow configuration, a channel may be included to allow flow of a substance into a reaction chamber and a separate channel may be used to allow outflow of a substance from the reaction chamber. More than one channel may be included for use in any inflow or outflow function.

A regulator device, such as a valve, may be included to further regulate flow of materials into and out of the reaction chamber. Further, a cap or seal is optionally used to close a channel. For example, where a fuel cell is operated remotely or as a single use device such that no additional materials are added, a cap or seal is optionally used to close a channel.

A pump may be provided for enhancing flow of liquid or gas into and/or out of a reaction chamber.

Exoelectrogenic microbes included in an MFC or MEC preferably include at least one or more species of exoelectrogenic bacteria. The terms "exoelectrogenic bacteria" and "anodophilic bacteria" are used interchangeably herein refer to bacteria that transfer electrons to an electrode, either directly or indirectly. In general, exoelectrogenic bacteria are obligate or facultative anaerobes. Examples of exoelectrogenic bacteria include bacteria selected from the families Aeromonadaceac, Alteromonadaceae, Clostridiaceae, Comamonadaceac, Desulfuromonaceae, Enterobacteriaceae, Geobacteraceae, Pasturellaceac, and Pseudomonadaceae. These and other examples of bacteria suitable for use in an inventive system are described in Bond, D. R., et al., Science 295, 483-485, 2002; Bond, D. R. et al., Appl. Environ. Microbiol. 69, 1548-1555, 2003; Rabaey, K., et al., Biotechnol. Lett. 25, 1531-1535, 2003; U.S. Pat. No. 5,976, 719; Kim, H. J., t al., Enzyme Microbiol. Tech. 30, 145-152, 2002; Park, H. S., et al., Anaerobe 7, 297-306, 2001; Chauduri, S. K., et al., Nat. Biotechnol., 21:1229-1232, 2003; Park, D. H. et al., Appl. Microbiol. Biotechnol., 59:58-61, 2002; Kim, N. et al., Biotechnol. Bioeng., 70:109-114, 2000; Park, D. H. et al., Appl. Environ. Microbiol., 66, 1292-1297, 2000; Pham, C. A. et al., Enzyme Microb. Technol., 30: 145-152, 2003; and Logan, B. E., et al., Trends Microbiol., 14(12):512-518.

Exoelectrogenic bacteria preferably are in contact with an anode for direct transfer of electrons to the anode. However, in the case of exoelectrogenic bacteria which transfer electrons through a mediator, the bacteria may be present elsewhere in the reactor and still function to produce electrons useful in an inventive process.

Optionally, a mediator of electron transfer is included in a fuel cell. Such mediators are exemplified by ferric oxides, neutral red, anthraquinone-1,6-disulfonic acid (ADQS) and 1,4-napthoquinone (NQ). Mediators are optionally chemically bound to the anode, or the anode modified by various treatments, such as coating, to contain one or more mediators.

Exoelectrogenic bacteria may be provided as a purified culture, enriched in exoelectrogenic bacteria, or even enriched in a specified species of bacteria, if desired. Pure culture tests have reported Coulombic efficiencies as high as 98.6% in Bond, D, R. et al., Appl. Environ. Microbiol. 69, 1548-1555, 2003. Thus, the use of selected strains may increase overall electron recovery and hydrogen production, especially where such systems can be used under sterile conditions. Bacteria can be selected or genetically engineered that can increase Coulombic efficiencies and potentials generated at the anode.

Further, a mixed population of bacteria may be provided, including exoelectrogenic anaerobes and other bacteria.

A biodegradable substrate included in a microbial fuel cell according to embodiments of the present invention is oxidizable by exoclectrogenic bacteria or biodegradable to produce a material oxidizable by exoelectrogenic bacteria.

A biodegradable substrate is an organic material biodegradable to produce an organic substrate oxidizable by exoelectrogenic bacteria in preferred embodiments. Any of various types of biodegradable organic matter may be used as "fuel" for bacteria in an MEC or MFC, including carbohydrates, amino acids, fats, lipids and proteins, as well as animal, human, municipal, agricultural and industrial wastewaters. Naturally occurring and/or synthetic polymers illustratively including carbohydrates such as chitin and cellulose, and biodegradable plastics such as biodegradable aliphatic polyesters, biodegradable aliphatic-aromatic polyesters, biodegradable polyurethanes and biodegradable polyvinyl alcohols. Specific examples of biodegradable plastics include polyhydroxyalkanoates, polyhydroxybutyrate, polyhydroxyhexanoate, polyhydroxyvalerate, polyglycolic acid, polylactic acid, polycaprolactone, polybutylene succinate, polybutylene succinate adipate, polyethylene succinate, aliphatic-aromatic copolyesters, polyethylene terephthalate, polybutylene adipate/terephthalate and polymethylene adipate/terephthalate.

Organic substrates oxidizable by exoelectrogenic bacteria are known in the art. Illustrative examples of an organic substrate oxidizable by exoclectrogenic bacteria include, but are not limited to, monosaccharides, disaccharides, amino acids, straight chain or branched $C_1$-$C_7$ compounds including, but not limited to, alcohols and volatile fatty acids. In addition, organic substrates oxidizable by exoelectrogenic bacteria include aromatic compounds such as toluene, phenol, cresol, benzoic acid, benzyl alcohol and benzaldchyde. Further organic substrates oxidizable by exoelectrogenic bacteria are described in Lovely, D. R. et al., Applied and Environmental Microbiology 56:1858-1864, 1990. In addition, a provided substrate may be provided in a form which is oxidizable by exoelectrogenic bacteria or biodegradable to produce an organic substrate oxidizable by exoclectrogenic bacteria.

Specific examples of organic substrates oxidizable by exoelectrogenic bacteria include glycerol, glucose, acetate, butyrate, ethanol, cysteine and combinations of any of these or other oxidizable organic substances.

The term "biodegradable" as used herein refers to an organic material decomposed by biological mechanisms illustratively including microbial action, heat and dissolution. Microbial action includes hydrolysis, for example.

Methods

Methods of producing electricity or hydrogen using microbial fuel cells or microbial electrolysis cells including an inventive cathode are provided according to the present invention.

A biological process for producing hydrogen or electric current according to embodiments of the present invention includes providing an MEC or MFC, the MEC or MFC including a reactor having an interior; providing exoelectrogenic bacteria disposed within the interior of the reactor; introducing a biodegradable organic material oxidizable by an oxidizing activity of the exoelectrogenic bacteria; incubating the organic material oxidizable by the exoelectrogenic bacteria under oxidizing reaction conditions such that electrons are produced and transferred to an anode. In an MFC, the electrons are transferred to the anode, and, through a load such as a device to be powered, to a stainless steel, nickel or titanium-containing cathode. Protons and electrons then react with oxygen at the cathode, producing water. In an MEC, the electrons are transferred to the anode and a power source is activated to increase a potential between the anode and a stainless steel, nickel or titanium-containing cathode, such that electrons and protons combine to produce hydrogen gas. Preferably, the activation of the power source includes application of a voltage in the range of 25-1000 millivolts, preferably in the range of 50-900 millivolts.

In operation, reaction conditions include variable such as pH, temperature, osmolarity, and ionic strength of the medium in the reactor.

In highly preferred embodiments, alkaline reactor conditions in an MEC or MFC reactor are avoided and the pH of the medium in the reactor is in the range of pH 3-pH 9, inclusive, and preferably between pH 5-pH 8.5 inclusive. It is noted that conditions for use of a cathode according to the present invention in an MEC are significantly different compared to conditions of oxygen reduction in seawater. Hydrogen evolution in an MEC takes place in neutral pH solutions, such as pH 5-9, over a large range of salinities. In contrast to previous methods, metals, such as stainless steel, are used in methods of the present invention as catalysts for hydrogen evolution at neutral pH. It is a further aspect of inventive cathodes that nickel oxides work well for hydrogen evolution in neutral pH conditions and in MECs.

An aqueous medium in a reaction chamber of an MEC or MFC of the present invention is formulated to be non-toxic to exoelectrogenic microbes in contact with the aqueous medium. Further, the medium or solvent may be adjusted to a be compatible with exoelectrogenic microbe metabolism, for instance by adjusting pH to be in a desired range, by adding a buffer to the medium or solvent if necessary, and by adjusting the osmolarity of the medium or solvent by dilution or addition of a osmotically active substance. Ionic strength may be adjusted by dilution or addition of a salt for instance. Further, nutrients, cofactors, vitamins and other such additives may be included to maintain a healthy bacterial population, if desired, see for example examples of such additives described in Lovley and Phillips, Appl. Environ. Microbiol., 54(6):1472-1480.

Reaction temperatures are typically in the range of about 10-40° C. for non-thermophilic bacteria, although the device may be used at any temperature in the range of 0 to 100° C. by including suitable bacteria for growing at selected temperatures. However, maintaining a reaction temperature above ambient temperature may require energy input and it is preferred to maintain the reactor temperature at about 15-25° C. without input of energy. Reaction temperatures in the range of 16-25° C., inclusive or more preferably temperatures in the range of 18-24° C., inclusive and further preferably in the range of 19-22° C., inclusive, allow hydrogen generation, electrode potentials, Coulombic efficiencies and energy recoveries comparable to reactions run at 32° C. which is generally believed to be an optimal temperature for anaerobic growth and metabolism, including oxidation of an organic material. In particular embodiments, an MFC or MEC reactor is operated at temperatures up to about 40° C. at start-up and the temperature is then allowed to operate at ambient temperatures in the range of 10-40° C.

Ionic strength of a medium in a reactor is preferably in the range of 50-500 millimolar, more preferably in the range of 75-450 millimolar inclusive, and further preferably in the range of 100-400 millimolar, inclusive.

Methods for Fabricating Cathodes

Methods are provided according to embodiments of the present invention which include fabricating a cathode for an MEC or MFC without exposing the cathode to temperatures above 100° C. and/or pressures above ambient pressure. In particular embodiments, a coating included in a cathode of the present invention is applied to a stainless steel, nickel or titanium mesh without pressure application, such as by painting the mesh with a desired coating so that the coating adheres to the mesh and is present in the pores, forming a continuous coating on one or both sides of the mesh. In further particular embodiments, a coating included in a cathode of the present invention is applied to a stainless steel, nickel or titanium mesh and is not exposed to temperatures above 100° C. The term "ambient pressure" refers to air pressure of the surrounding atmosphere, generally about 1 atmosphere. The described preference against exposure to pressures above ambient pressure is intended to exclude "hot-press" application of materials in preferred embodiments.

Embodiments of inventive compositions and methods are illustrated in the following examples. These examples are provided for illustrative purposes and are not considered limitations on the scope of inventive compositions and methods.

EXAMPLES

Example 1

Cathodes

SS brush cathodes (Gordon Brush Mfg Co., Inc., Commerce, CA) were made of grade 304 SS, which has the composition: 0.08% C, 2% Mn, 0.045% P, 0.03% S, 1% Si, 18-20% Cr, and 8-11% Ni (balance Fe) (ASTM. Document number A 959-07. Standard guide for specifying harmonized standard grade compositions for wrought stainless steels. Table 1. Chemical Composition Limits, %., Oct. 4, 2008). The bristles (0.008 cm diameter) were wound into a twisted SS core (0.20 cm diameter) using an industrial brush manufacturing machine. The brushes were 2.5 cm long and 2.5 cm in diameter. On the basis of the mass and estimated surface area of the bristles, each brush (100% loading case) had 310 $cm^2$ of surface area, producing 2500 $m^2/m^3$-brush volume (95% porosity), for a specific surface area of AS=650 $m^2/m^3$ of reactor volume. In some tests, brushes with reduced bristle loadings of 50%, 25%, and 10% were used, with surface areas of 160 $cm^2$ (AS=340 $m^2/m^3$), 110 $cm^2$ (AS=240 $m^2/m^3$), and 79 $cm^2$ (AS=170 $m^2/m^3$), respectively. These areas include the surface area of the SS core, which is estimated at 2.4 $cm^2$ (5.1 $m^2/m^3$) based on the projected area of a cylinder. A flat piece of grade 304 SS (McMaster-Carr, Cleveland, Ohio) was used in some tests (surface area of 7 $cm^2$). SS cathodes were cleaned before use by sonication in an ultrasonic cleaner (model 1510, Branson, Danbury, Conn.) for 10 min in 70% ethanol, followed by rinsing with DI water, and sonication again for 5 min in fresh DI water. In one test a graphite fiber brush electrode containing a titanium wire core (surface area of 0.22 $m^2$; AS=4600 $m^2/m^3$) (Logan, B et al Environ. Sci. Technol. 2007, 41 (9), 3341-3346) was used as the cathode.

Reactor Construction

Figure 5:
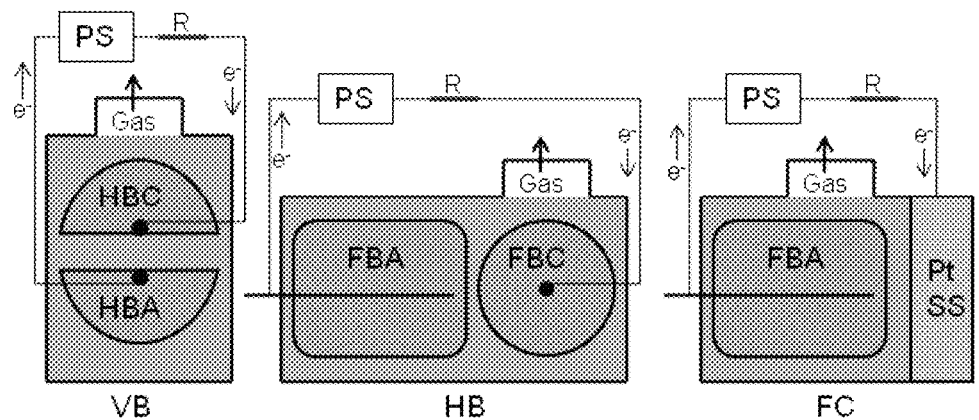
FIG. 5 illustrates reactor schematics: reactor VB (vertical brush): half brush anode, HBA; half brush cathode, HBC; reactor HB (horizontal brush): full brush anode, FBA; full brush cathode, FBC; reactor FC (flat cathode): platinized carbon cloth cathode, Pt, stainless steel cathode, SS. power supply, PS. 10Ω resistor, R.

FIG. 5 diagrammatically shows three different MEC architectures used to determine the effect of cathode brush architecture, with all reactors containing an ammonia treated, graphite fiber brush anode in which ammonia gas treatment of an anode is accomplished using a thermogravimetric analyzer. For this procedure, the furnace temperature was ramped up to 700° C. at 50° C./min using nitrogen gas (70 mL/min) before switching the gas feed to 5% $NH_3$ in helium gas. The anode is held at 700° C. for 60 min. before being cooled to room temperature under nitrogen gas (70 mL/min) over 120 min.

The first reactor (V=28 mL) contained a 100% loaded SS brush oriented vertically above and parallel to the core of the anode (Reactor VB). In order to reduce the spacing to 0.5 cm between the electrodes, both brushes were cut in half using scissors, each one forming a half-cylinder. The half SS brush had a reduced surface area of A=230 $cm^2$ but an increased specific surface area of AS=810 $m^2/m^3$. An anaerobic gas collection tube was installed above the brush cathode. A second reactor (V=48 mL) was made by combining a cube-shaped MFC to a second cube-shaped reactor that was 2.5 cm in length and had a gas collection tube attached on top (Reactor HB). Reactor HB was used to examine SS brush cathodes with different surface areas and the graphite brush cathode, with each cathode brush inserted perpendicular to the core of the anode. A third reactor contained either a Pt/C cathode (0.5 mg-Pt/cm$^2$) or a flat SS cathode (Reactor FC). Both flat cathodes had specific surface areas of AS=25 m$^2$/m$^3$. Prior to starting a batch cycle the gas collection tubes were crimped shut.

Startup and Operation

The brush anodes were first enriched in an MFC using the effluent from an active MFC. The anodes were transferred to MECs and fed sodium acetate (1 g/L; J. T. Baker) in a 50 mM phosphate buffer medium (PBS; Na$_2$HPO$_4$, 4.58 g/L; and NaH$_2$PO$_4$—H$_2$O, 2.45 g/L, pH=7.0) and nutrient solution (NH$_4$Cl, 0.31 g/L; KCl, 0.13 g/L; trace vitamins and minerals having a final solution conductivity of 7.5 mS/cm. At the end of each batch cycle, the crimp tops were removed, the contents drained, and the reactors left exposed to air for 20 min to help inhibit the growth of methanogens. After adding the medium and recrimping the collection tubes, the reactors were sparged for 15 min with ultrahigh purity nitrogen (UHP) (99.998%), covered with aluminum foil to prevent the growth of phototrophic microorganisms, and placed in a constant temperature room (30° C.). Performance of the reactors was evaluated in terms of current density and continuous gas production rate using a respirometer. Gas analysis as previously described was performed for the optimized reactor (Reactor VB) (Call, D. et al, Environ. Sci. Technol. 2008, 42 (9), 3401-3406). Complete substrate removal was assumed for each batch cycle, equivalent to a chemical oxygen demand (COD) of 0.022 g-COD. A fixed voltage ($E_{ap}$) of 0.6 V was applied to the reactor circuit using a power source (model 3645A; Circuit Specialists, Inc., Mesa, Ariz.), and the current was determined by measuring the voltage across a 10Ω resistor. An Ag/AgCl reference electrode (RE-5B; BASi, West Lafayette, Ind.) was placed in each reactor, with the cathode potential recorded using a multimeter (Model 2700; Keithley Instruments, Inc., Cleveland, Ohio).

Effect of Cathode Surface Area

Figure 6:
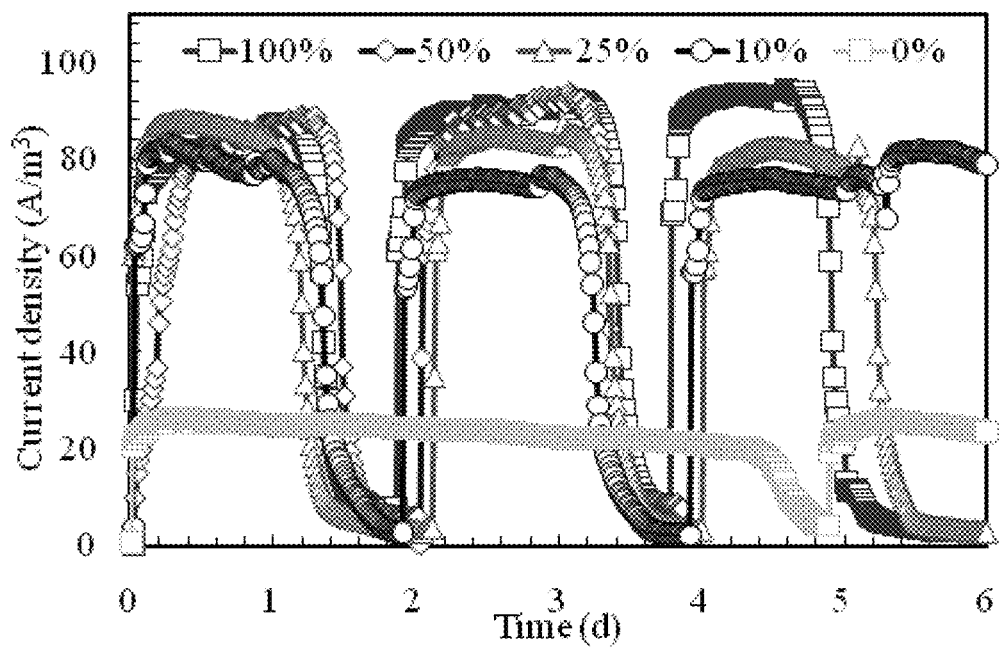
FIG. 6 is a graph showing current densities versus time for SS brush cathodes with different bristle loadings of 100%, 50%, 25%, 10% or 0% (brush base core only) at $E_{ap}$=0.6 V.
Figure 7:
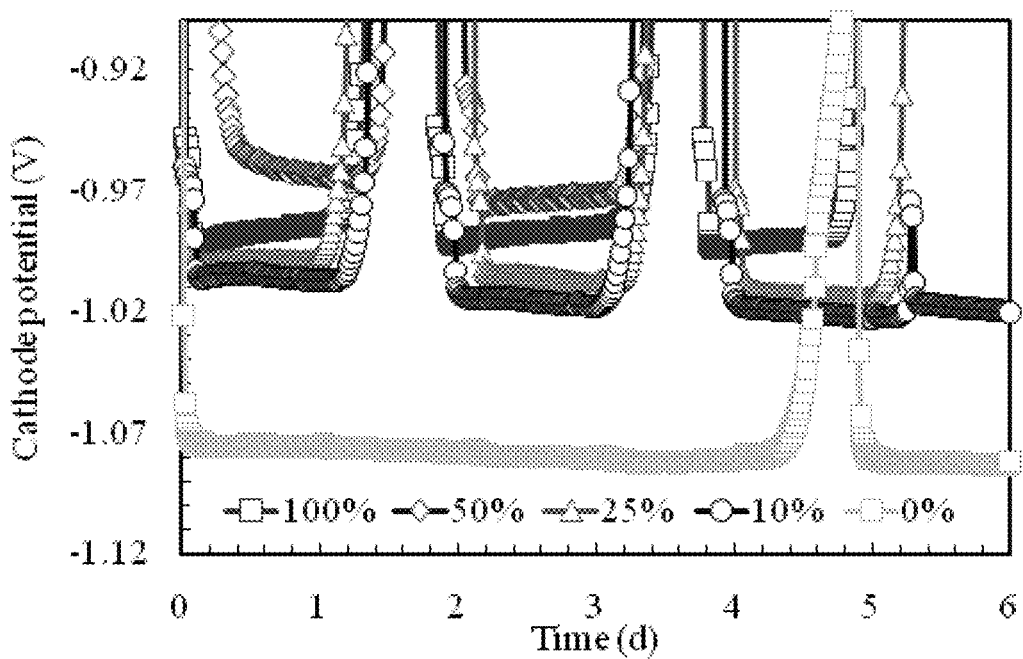
FIG. 7 is a graph showing cathode potentials (versus Ag/AgCl) versus time for consecutive batch cycles using SS brush cathodes with different bristle loadings at $E_{ap}$=0.6 V.

The impact of cathode surface area was evaluated using MECs with horizontally placed brush cathodes (Reactor HB). Varying the SS brush bristle loadings did not substantially impact current generation (FIG. 6). For brush bristle loadings of 50-100%, the, current density remained around 90 A/m$^3$. Lowering the bristle loading below 50% resulted in a slight decrease in current density to 85±3 A/m$^3$ for the 25% loaded brush and 78±4 A/m$^3$ for the 10% loaded brush. With no brush bristles (base core only), the MEC generated 24±0 A/m$^3$, indicating there was a significant level of activity due to the SS core on current density. The cathodic overpotential decreased with the increasing bristle loadings from no bristles up to 25% bristle loading (FIG. 7). The 50% loaded brush exhibited the lowest cathodic overpotential of −0.968 (0.007 V, while the 100% loaded brush reached-0.990±0.002 V. The brush core with no bristles had the highest cathodic overpotential of −1.082±0.005 V (vs Ag/AgCl).

Current Densities Using Other Cathodes

Figure 8:
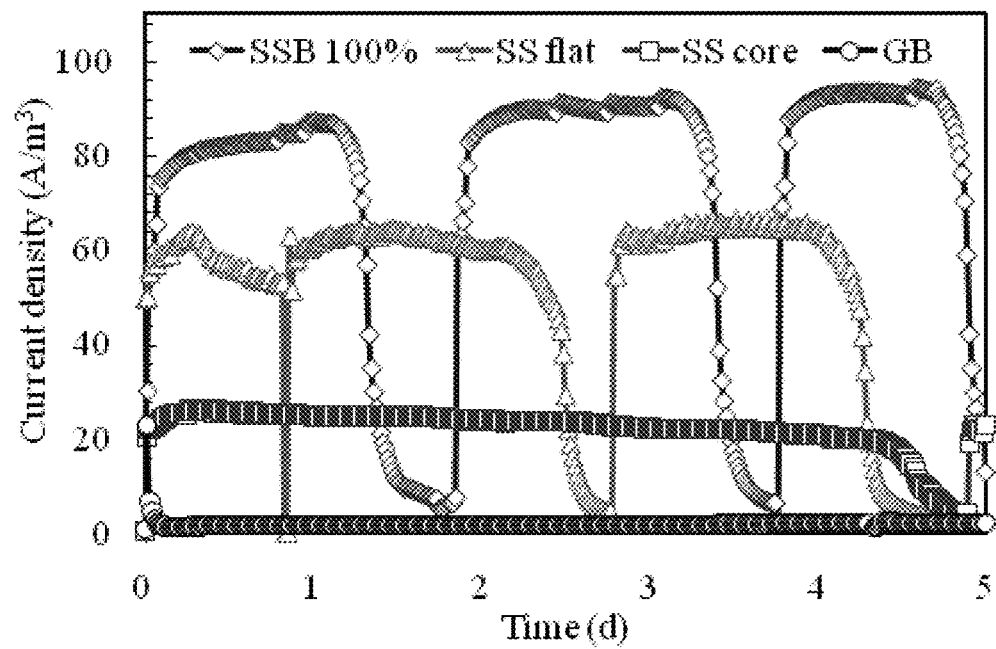
FIG. 8 is a graph showing current densities versus time for a 100% loaded SS brush cathode (SSB 100%), a flat SS cathode (SS flat), a SS brush core (SS core), and a graphite brush cathode (GB) at $E_{ap}$=0.6 V.

To examine the impact of material composition on current generation, a graphite fiber brush cathode containing a titanium wire core was tested in Reactor HB. Although the specific surface area of the graphite brush was 7 times larger than the 100% SS brush tested, current production was substantially lower. A current density of 1.7+0.0 A/m$^3$ was achieved after three days (FIG. 8). The SS brush core with no bristles and identical electrode spacing generated a current density 14 times larger than the graphite brush. Thus, large surface area alone could not account for the performance of the SS brushes. The importance of the SS as a catalyst was further verified by using a flat SS cathode in Reactor FC. Although the specific surface area of the flat SS cathode was more than a hundred fold smaller than the graphite brush cathode, current generation was greater (64-2 A/m$^3$). The current density produced by the flat SS cathode (2.6 cm electrode spacing) was also 2.7 times greater than the SS brush core (24±0 A/m$^3$; 3.5 cm electrode spacing). Although the flat SS cathode had a slightly larger surface area (A=7 cm$^2$) than the SS brush core (A=2.4 cm$^2$), the higher current density of the flat SS cathode suggests that the orientation and distance of the cathode was more important for increased current density than surface area.

Comparison to a Platinized Cathode

Figure 9:
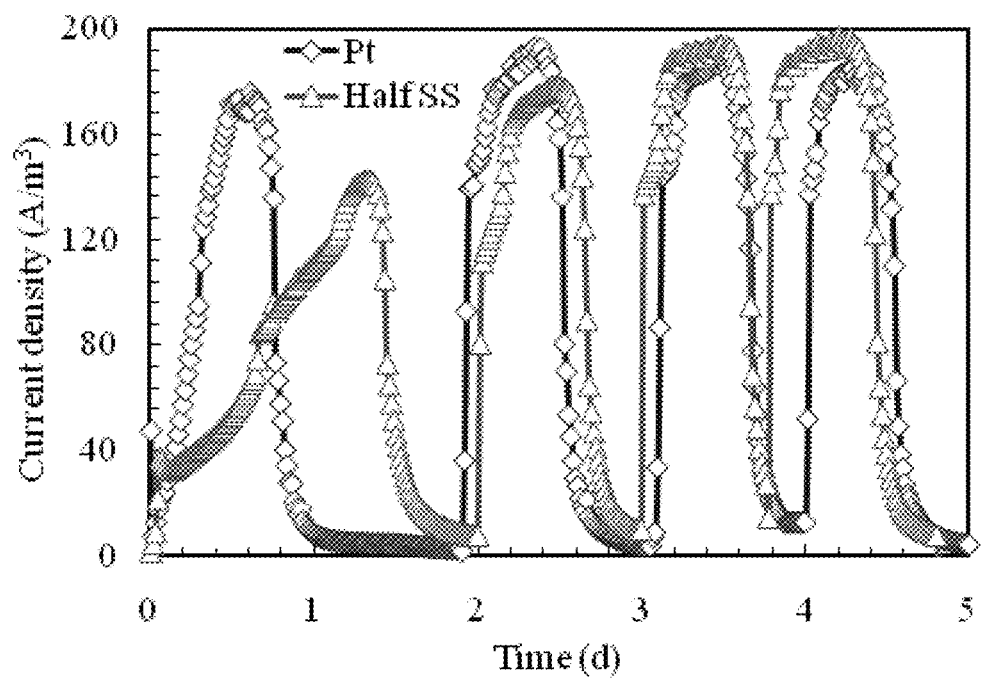
FIG. 9 is a graph showing current density versus time for both the platinized carbon cloth cathode (Pt) and the SS brush cathode cut in half (Half SS) at $E_{ap}$=0.6 V.
Figure 10:
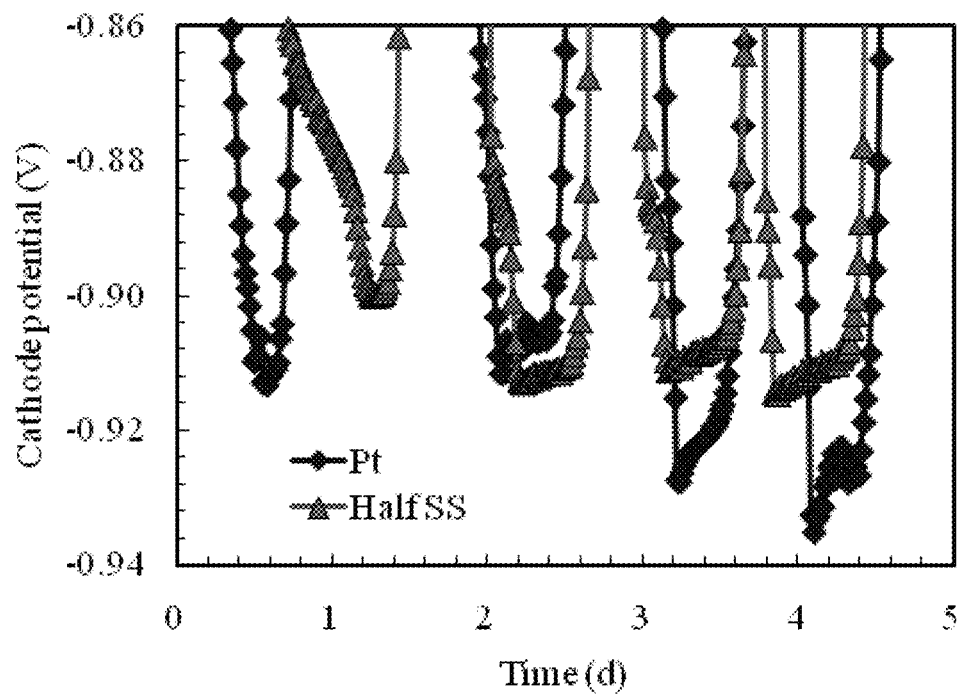
FIG. 10 is a graph showing cathode potentials (versus Ag/AgCl) versus time for both the Pt/C cathode and the SS brush cathode cut in half (Half SS) at $E_{ap}$=0.6 V.

Because the brush bristle loadings did not have an appreciable impact on current production, it was believed that the main factor limiting power generation was electrode distance. Therefore, a fully loaded SS brush was trimmed in half and placed as close as possible above a similarly trimmed graphite brush anode (Reactor VB, AS) 810 m$^2$/m$^3$) in order to create a configuration capable of generating current densities similar to Pt/C cathodes. During the first few cycles, the current density was greater in the MEC using the Pt/C cathode (Reactor FC) than in the MEC with the vertically aligned SS brush cathode (FIG. 9). Within four cycles, however, Reactor VB was producing the highest current density of 194±1 A/m$^3$, compared to 182±2 A/m$^3$ for Reactor FC. For the final three batch cycles, both reactors generated a similar average current density, with Reactor FC reaching 188±10 A/m$^3$ and Reactor VB obtaining 186±2 A/m$^3$. The higher current density of Reactor VB with the SS brush was a result of a lower cathodic overpotential than that of Reactor FC with the Pt/C cathode (FIG. 10). During the first batch cycle, the Pt/C cathode had a higher overpotential than that of the SS brush, likely due to the higher current density. By the second cycle, both the SS brush and Pt/C cathode exhibited roughly the same overpotential, but several later cycles the Pt/C cathode showed an increase in overpotential (cycles 3 and 4). This trend may have been due to minor Pt catalyst inactivation in combination with an activation of the SS for the hydrogen evolution reaction (HER). After the first two cycles of reactor acclimation, the SS cathode in Reactor VB produced a cathode potential of −0.910±0.002 V, whereas the Pt/C cathode exhibited a higher overpotential with a value of −0.924±0.003 V. These potentials correspond to cathodic losses of about 0.29 V for the SS brush and 0.30 V for the Pt/C cathode relative to the equilibrium potential of hydrogen formation (−0.62 V vs Ag/AgCl).

Energy Recoveries and Production Rates

Hydrogen production, energy recovery, and hydrogen recovery results were calculated as described in Logan, B. E. et al, Environ. Sci. Technol. 2008, 42 (23), 8630-8640; Call, D. et al, Environ. Sci. Technol. 2008, 42 (9), 3401-3406). The recoveries and production rates for the SS brush in Reactor VB were averaged over the last three cycles in FIG. 9. Relative to only the electrical energy input, the energy recovery reached $\eta_E$=221±8%. When the substrate energy was also included, the overall energy recovery was $\eta_{E+S}$=78±5%. The cathodic hydrogen recovery was $\tau_{CAT}$=83±8%, and the average hydrogen production rate was Q=1.7±0.1 m$^3$-H$_2$/m$^3$-d.

Linear Sweep Voltammetry

Linear sweep voltammetry (LSV) was performed on a potentiostat (model PC4/750, Gamry Instruments, Warminster, Pa.) with 1 mV/s rates on the cathodes (100% loaded SS brush, flat SS, and Pt/C) at 30° C. in a 28 mL reactor. The LSV reactor also included an Ag/AgCl reference electrode (Princeton Applied Research, Oak Ridge, Tenn.) and a 2 cm$^2$ pure platinum foil counter electrode. The reactor was filled with 50 mM PBS, pH 7.0, without trace nutrients and sparged with UHP nitrogen. Chronopotentiometry at 50 mA for 24 h in 50 mM PBS was performed to simulate accelerated use of a 100% loaded SS brush. Stripping was performed with cyclic voltammetry in 0.5 M$H_2SO_4$ from −0.5 to +1.5 V vs Ag/AgCl at 250 mV/s.

Figure 11:
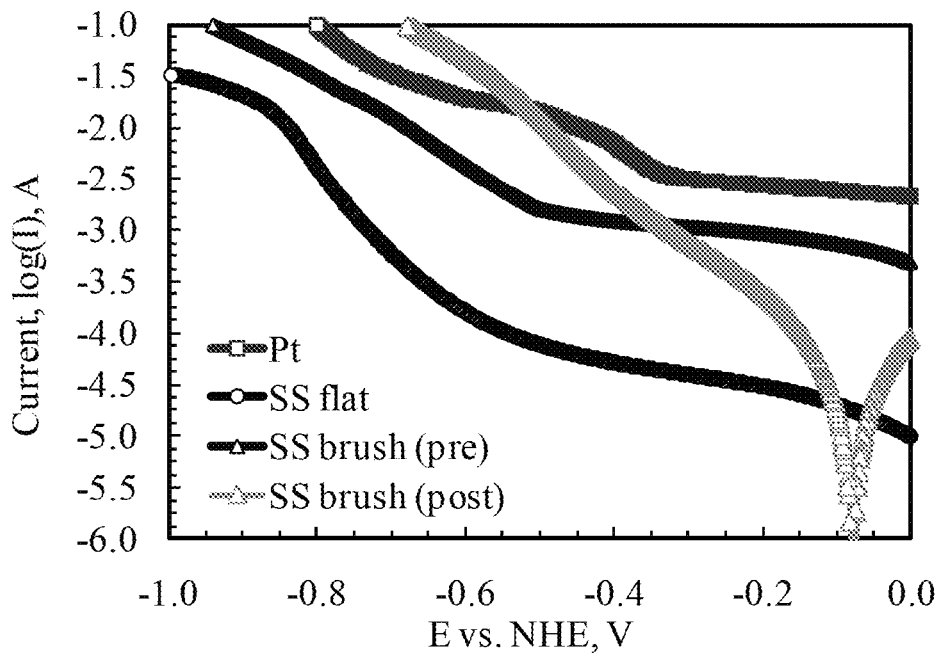
FIG. 11 is a graph showing LSV curves for the platinized cathode (Pt), the 100% loaded SS brush cathode before (pre) and after (post) accelerated use, and the flat SS cathode (SS Flat)

LSV scans performed only on the cathodes and not the assembled MECs indicated that the Pt/C cathode could initially operate at 0.1-0.2 V lower cathodic overpotentials than those of the 100% loaded SS brush (FIG. 11). The activity of the SS brush for hydrogen evolution improved after simulating accelerated use, resulting in catalytic activity similar to the Pt/C cathode. In the initial LSV, the SS brush had a resting potential of +0.06 V vs NHE (where the current was zero) and small positive currents for more positive potentials. After accelerated use, the resting potential shifted to −0.08 V vs NHE. To remove any possible SS surface corrosion products that may have accumulated during the accelerated use, the SS brush was stripped using cyclic voltammetry until the currents corresponding to hydrogen and oxygen evolution became constant (about five cycles). A third LSV performed on the SS brush after cyclic voltammetry produced results very similar those obtained after the initial use LSV (data not shown), suggesting that corrosion products on the surface of the SS that occur with use cause the SS to become more active toward hydrogen evolution. Compared to a flat SS cathode, the SS brush exhibited a lower overpotential, particularly at lower currents, thus confirming the effectiveness of the high surface area. Current generation occurred below the standard state theoretical potential for hydrogen production (−0.42 V vs NHE; $P_{H2}$=1 atm) in FIG. 11 because the LSV was performed under atmospheric conditions where the partial pressure of hydrogen ($P_{H2}$=5×10-5 atm) lowers the theoretical potential to −0.29 V.

High current densities were achieved in MECs without a precious metal catalyst by using high surface area SS cathodes.

Example 2

Hydrogen production in an MEC using a cathode made of stainless steel, nickel, and stainless steel with a high nickel content. Single-chamber MEC reactors were constructed from polycarbonate cut to produce a cylindrical chamber 4 cm long by 3 cm in diameter (empty bed volume of 28 mL). The anodes were ammonia treated graphite brushes, 25 mm diameter×25 mm length, 0.22 m$^2$ surface area. Ammonia treatment of the graphite brushes was accomplished as described in Example 1.

Reactors were inoculated with the anode solution from another acetate-fed MEC reactor that had been running for over 1 year and acetate (1 g/L) in medium. The medium used was a 50 mM phosphate buffer solution (4.58 g/L $Na_2HPO_4$ and 2.45 g/L $NaH_2PO_4 \cdot H_2O$; pH=7.0), 0.31 g/L $NH_4Cl$, 0.13 g/L KCl, and trace vitamins and minerals.

Cathodes of stainless steel alloys 304, 316, 420 and A286 or nickel alloys 201, 400, 625 and HX were made by cutting sheet metal (McMaster-Carr, IL) into 3.8 cm diameter disks. Metal compositions are listed in Table I. A platinum metal disk (99.9% purity) used for comparison to these other metal materials was pre-cut by the manufacturer (Hauser & Miller, MO). Metal cathodes were cleaned with ethanol before placing them in the reactors. Carbon cloth cathodes (projected surface area of 7 cm$^2$) were made using a platinum catalyst (0.5 mg cm$^{-2}$)

TABLE I

Stainless Steel and Nickel Alloys Composition (% by weight)

| Alloy | Fe | C | Mn | P | S | Mo | Si | Cr | Ni | Cu | Other | Other |
|---|---|---|---|---|---|---|---|---|---|---|---|---|
| SS 304 | | 0.08 | 2 | 0.45 | 0.03 | 0 | 1 | 18-20 | 8-10.5 | 1 | | |
| SS 316 | | 0.08 | 2 | 0.05 | 0.03 | 2-3 | 1 | 16-18 | 10-14 | 2-3 | | |
| SS 420 | | 0.15 | 1 | 0.04 | 0.03 | 0 | 1 | 13 | | | | |
| SS A286 | | 0.08 | 2 | 0.025 | 0.025 | 1-1.5 | 1 | 13.5-16 | 24-27 | | 1.9-2.35 Ti | |
| Ni 201 | 0.4 | 0.02 | 0.35 | | | | | | 99 | 0.25 | .35 Si | .01 S |
| Ni 400 | 1.6 | | 1.1 | | | | | | 65.1 | 32 | | |
| Ni 625 | 2.5 | | | | | 9 | | 21.5 | 61 | | 3.6 Nb | |
| Ni HX | 18 | 0.1 | | | | 9 | | 22 | 47 | | 0.6 W | 1.5 Co |

A power source (3645A; Circuit Specialists, Inc., AZ) was used to apply either 0.6 or 0.9V to the reactors. After each cycle, the reactors were drained, refilled with substrate solution, and sparged with ultra high purity nitrogen gas for 5 min. The reactors were maintained in a 30*C constant temperature room. Once reactors reached similar current (~0.57 mA cm$^2$) and gas production volumes (~30 ml) for three consecutive cycles using carbon cloth cathodes, the cathodes were replaced with sheet metal cathodes. All reactors were run in duplicate, and tests with new cathodes were run for at least three consecutive cycles.

Analysis

Gas production was measured using a respirometer (AER-200, Challenge Technology, AZ). Gas flowing out of the respirometer was collected in sampling gas bags (250 ml capacity, Cali-5 bond, Calibrated Instruments Inc., NY). The composition of the MEC headspace and the gas bags were analyzed using two gas chromatographs (models 8610B and 310, SRI Instruments, CA) equipped with Alltech Molesieve 5A 80/100 stainless steel-tubing columns and thermal conductivity detectors (TCDs). Argon was used as the carrier gas for $H_2$, $O_2$, $N_2$ and $CH_4$ analysis, and helium was used as the carrier gas for $CO_2$ analysis. Voltage across an external resistor ($R_{ex}$=10Ω) was measured using a multimeter (2700, Keithley Instruments, Inc., OH) to calculate current. Electrochemical experiments were conducted with a potentiostat (PC4/750TM, Echem Analyst, v. 5.5, Gamry Instruments, PA). CV scans were done over three cycles, from 0 to 1 V, at a scan rate of 1 mVs$^{-1}$ on the MEC cells after use. Scanning electron microscopy/energy dispersive X-ray spectroscopy (SEM-EDS) analysis was done at 20 kV (Quanta 200, FEI, OR).

Calculations

Hydrogen recovery, energy recovery, volumetric density and hydrogen production rates were used to evaluate reactor performance (2). The theoretical number of hydrogen moles produced ($n_{H2,COD}$), based on COD removal is:

$$n_{H2,COD} = \frac{b_{eO2} v_L \Delta COD}{2 M_{O2}} \quad (1)$$

where $b_{eO2}=4$ is the number of electrons exchanged per mole of oxygen, $v_L=32$ ml the volume of liquid in the reactor, $M_{O2}=32$ g mol$^{-1}$ the molecular weight of oxygen, 2 the number of moles of electrons per mole of hydrogen gas, and $\Delta COD$ the change in substrate concentration (g L$^{-1}$).

The theoretical number of hydrogen moles that can be recovered based on the measured current ($n_{H2,cat}$) is:

$$n_{H2,cat} = \frac{\int_{t=0}^{t} I dt}{2F} \quad (2)$$

where $I=V/R_{ex}$ is the current (A) calculated from the voltage across the resistor (10Ω) and dt is the time interval (1,200 s) for data collection.

The overall hydrogen recovery ($r_{H2,COD}$) is the ratio of hydrogen recovered compared to the maximum theoretical hydrogen produced based on substrate utilization:

$$r_{H2,COD} = \frac{n_{H2}}{n_{H2,COD}} \quad (3)$$

where $n_{H2}$ is the actual number of hydrogen moles produced. The cathodic hydrogen recovery ($r_{H2,cat}$) is the fraction of electrons that are recovered as hydrogen gas from the total number of electrons that reach the cathode, or $$r_{H2,cat} = \frac{n_{H2}}{n_{H2,cat}} \quad (4)$$

The Coulombic efficiency ($C_E$) is the ratio of electrons recovered as hydrogen gas relative to the total electrons available from substrate consumption, calculated as:

$$C_E = \frac{n_{H2,cat}}{n_{H2,COD}} = \frac{r_{H2,COD}}{r_{H2,cat}} \quad (5)$$

The energy efficiency relative to electrical input ($\eta_E$) is the ratio of energy content of hydrogen produced to the input electrical energy:

$$\eta_E = \frac{W_{H2}}{W_E} = \frac{n_{H2} \Delta H_{H2}}{\sum_{1}^{n}(I E_{ap} \Delta t - I^2 R_{ex} \Delta t)} \quad (6)$$

where $W_{H2}$ (kJ) is the energy produced by hydrogen, $W_E$ (kJ) the amount of energy added to the circuit by the power source minus the losses across the resistor, $\Delta H_{H2}=285.83$ kJ/mol the energy content of hydrogen based on the heat of combustion and $E_{ap}$ (V) the voltage applied by the power source. The number of moles of substrate consumed during a batch cycle based on COD removal ($n_s$) is:

$$n_s = \frac{\Delta COD v_L}{M_s} \quad (7)$$

where $M_S=82$ g mol$^{-1}$ is the substrate's molecular weight. When using sodium acetate, the molecular weight needs to be multiplied by a conversion factor of 0.78 g COD g$^{-1}$ sodium acetate. The energy efficiency relative to the substrate ($\eta_S$) is:

$$\eta_S = \frac{W_{H2}}{W_S} = \frac{n_{H2} \Delta H_{H2}}{\Delta H_S n_S} \quad (8)$$

where $\Delta H_S=870.28$ kJ/mol is the heat of combustion of the substrate. The overall energy recovery based on both electric and substrate inputs ($\eta_{E+S}$) is:

$$\eta_{E+S} = \frac{W_{H2}}{W_E + W_S} \quad (9)$$

The hydrogen production rate (Q) (m$^3$ H$_2$m$^{-3}$d$^{-1}$) was evaluated in terms of current produced per volume of reactor and the gas rate per volume as:

$$Q = 3.68 \times 10^{-5} I_V T r_{H2,cat} \quad (10)$$

where $3.68 \times 10^{-5}$ is a constant that includes Faraday's constant, a pressure of 1 atm and unit conversions, $I_v$ (A m$^{-3}$) is the volumetric current density averaged over a 4 hour period of maximum current production and divided by the liquid volume, and T(K) is the temperature.

The Butler-Volmer reaction for hydrogen evolution was used to determine the catalytic performance of the metals, where the reverse current was considered negligible. CV scans for the complete MEC's were converted to Tafel plots by plotting log I as a function of voltage. The transformed Butler-Volmer equation was used to obtain slopes and y-intercepts via linear regression of the Tafel plots using:

$$\log J = \log J_0 + \frac{\alpha_c n_e F}{2.303 RT}(E - E_0) \quad (11)$$

where J (A cm$^{-2}$) is the current density, $J_0$ (A cm$^{-2}$) is the exchange current density, $\alpha_c$ is the cathodic transfer coefficient, $n_e$ is the number of electrons per reaction, E (V) is the working potential and $E_0$ (V) is the equilibrium potential. The equilibrium potential ($E_0$) is equal to the hydrogen potential ($E_{H2}$):

$$E_{H2} = 0 + 0.0602 \log\left[\frac{1/2H_2}{H^+}\right] = 0 - 0.0602pH + 0.0301\log(p_{H_2}) \quad (12)$$

The equilibrium potential $E_0=E_{H2}=-0.4458V$ for the experimental conditions presented: $T=30°$ C., pH=7 and a partial pressure for hydrogen pH=0.15 atm. The hydrogen partial pressure value was the average hydrogen gas composition of all MEC reactors over complete cycles.

Figure 12:
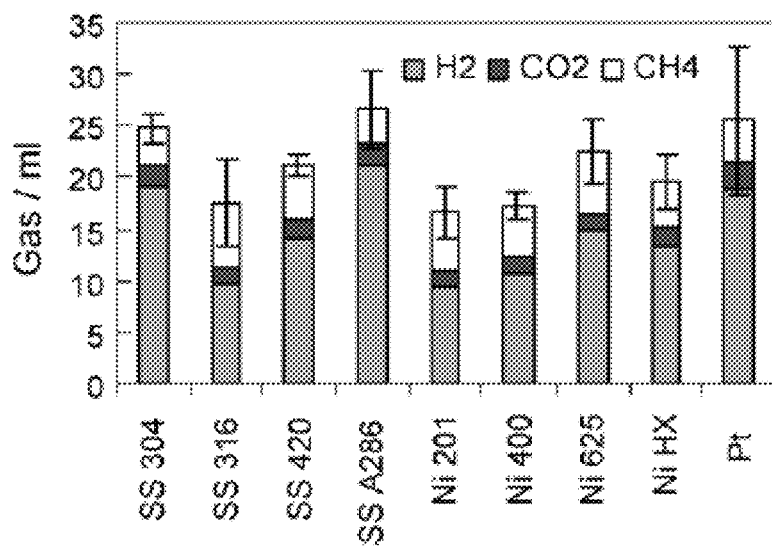
FIG. 12 is a graph showing gas production of MECs with different stainless steel and nickel cathodes at an applied voltage or 0.9V.
Figure 13:
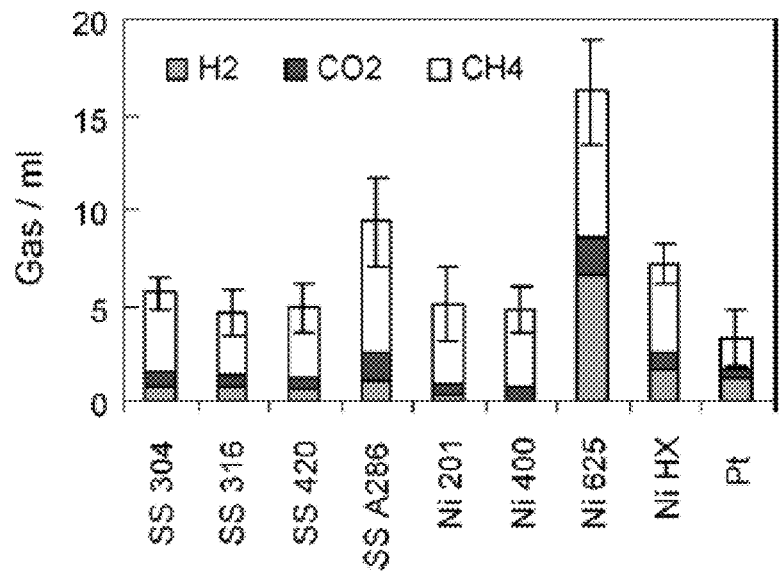
FIG. 13 is a graph showing gas production of MECs with different stainless steel and nickel cathodes at an applied voltage or 0.6V.

SS alloys A286 (21.2±2.2 ml) and 304 (19.1±1.1 ml) produced twice as much hydrogen as Ni 201 (9.5±1.6 ml) or SS 316 (9.5±2.6 mil) at an applied voltage of 0.9V (FIG. 12). Platinum sheet metal produced slightly less hydrogen gas (18.9±5.4 ml) than SS A286 and SS 304. While gas production was consistent over multiple cycles with the SS and Ni materials, gas production with platinum sheet metal decreased with continued use. The total gas production during the first cycle using platinum was 34.5±2.6 ml, but only 19.2-1.3 ml by the third cycle. This change in gas production resulted in a higher variability of the gas produced with platinum than with the other metals.

higher for SS A286 ($Q=1.5$ m$^3$ m$^{-3}$ day$^{-1}$) than for any of the other metals, including platinum ($Q=0.68$ m$^3$m$^{-3}$ day$^{-1}$). The platinum sheet metal displayed only average performance compared to the other metals, being surpassed by both SS 304 and SS A286 in terms of hydrogen recoveries and energy efficiencies at an applied voltage of 0.9 V. Overall gas production was reduced for all the metals at a lower applied voltage of 0.6V (average=6.8±3.9 ml H$_2$) compared to 0.9V (21.3±3.8 ml H$_2$) (FIG. 13). Hydrogen concentrations at 0.6V were reduced to 17.2±13.2% H$_2$ (vs. 67.5±8.6% H$_2$ at 0.9 V), and methane concentrations increased (69.0±13.3% at 0.6V vs. 23.9±8.3% at 0.9 V). Ni 625 performed better than the other metals in terms of total hydrogen gas production at this lower applied voltage (6.61 ml H$_2$), but the product gas was mainly methane (47.3% CH$_4$, 40.8% H$_2$, 11.9% CO$_2$). Platinum sheet metal produced only 11.2 ml H$_2$, with a gas composition of 49.8% CH$_4$, 35.0% H$_2$ and 15.1% CO$_2$. Maximum current densities at 0.9V were higher for both SS A286 (1.01±0.18 mAcm$^{-2}$) and Ni 625 (0.73±0.099 mAcm$^{-2}$) than for the platinum

TABLE II

MEC results for different metal cathodes (stainless steel, nickel and platinum) at an applied voltage of 0.9 V

| Metal | $r_{H2, cat}$ (%) | $r_{H2, COD}$ (%) | $\eta_E$ (%) | $\eta_{E+S}$ (%) | $I_v$ (A/m$^3$) | Q (m$^3$/m$^3$ d) | H$_2$ (%) |
|---|---|---|---|---|---|---|---|
| SS 304 | 53 ± 1 | 49 ± 0 | 90 ± 2 | 38 ± 1 | 100 ± 4 | 0.59 ± 0.01 | 77 ± 1 |
| SS 316 | 27 ± 6 | 25 ± 6 | 47 ± 10 | 19 ± 4 | 116 ± 1 | 0.35 ± 0.08 | 55 ± 10 |
| SS 420 | 43 ± 2 | 38 ± 1 | 73 ± 3 | 30 ± 1 | 122 ± 10 | 0.58 ± 0.07 | 67 ± 2 |
| SS A286 | 61 ± 3 | 62 ± 6 | 107 ± 5 | 46 ± 3 | 222 ± 4 | 1.50 ± 0.04 | 80 ± 2 |
| Ni 201 | 27 ± 4 | 26 ± 3 | 46 ± 7 | 20 ± 3 | 127 ± 8 | 0.38 ± 0.04 | 57 ± 3 |
| Ni 400 | 31 ± 5 | 31 ± 8 | 53 ± 9 | 23 ± 5 | 116 ± 9 | 0.41 ± 0.10 | 62 ± 8 |
| Ni 625 | 43 ± 9 | 41 ± 13 | 75 ± 16 | 31 ± 8 | 160 ± 22 | 0.79 ± 0.27 | 67 ± 9 |
| Ni HX | 40 ± 8 | 38 ± 7 | 68 ± 14 | 29 ± 5 | 124 ± 14 | 0.55 ± 0.11 | 69 ± 4 |
| Pt | 47 ± 2 | 46 ± 4 | 81 ± 3 | 35 ± 2 | 129 ± 7 | 0.68 ± 0.06 | 74 ± 2 |

Table II is a summary of MEC results for different metal cathodes (stainless steel, nickel and platinum) at an applied voltage of 0.9 V.

Figure 14:
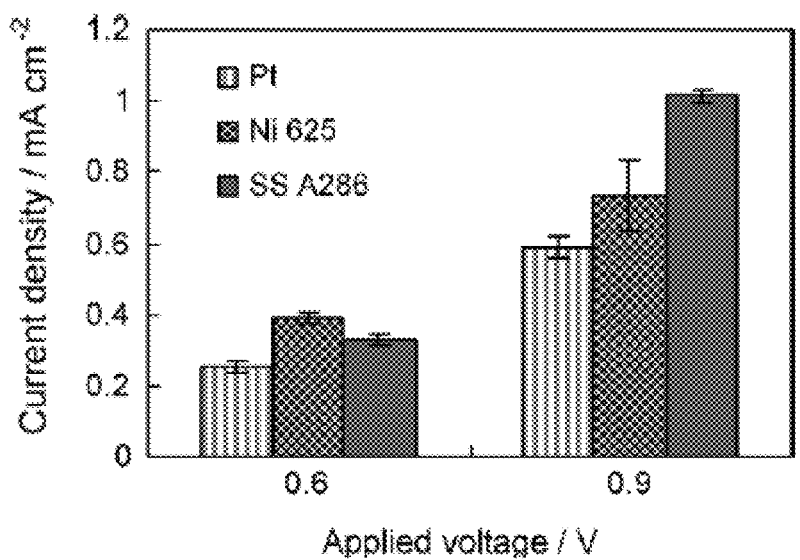
FIG. 14 is a graph showing current densities for MECs with platinum, Ni 625 or SS A286 cathodes at applied voltages of 0.6 and 0.9V.

The best performing alloys based on MEC recoveries and efficiencies were SS A286, SS 304 and Ni 625 (Table II) (Eap=0.9 V). Of these three materials, SS A286 consistently had the best performance for all parameters used to evaluate the MECs (rH$_2$, cat, rH$_2$, COD, ηE, ηE+S, IV, Q, and H$_2$ content). The hydrogen production rate was significantly sheet metal (0.59±0.03 mAcm$^{-2}$) (FIG. 14). At 0.6 V, the difference between current densities of these metals was almost non-existent (0.25+0.014 to 0.39±0.014mAcm$^{-2}$). Therefore, a higher applied voltage was needed to properly differentiate these metal surfaces. The performance of the metal alloys for use as cathodes in MECs was evaluated on the basis of the slopes and y-intercepts from Tafel plots (Table III).

TABLE III

| | Low Current Density | | High Current Density | | |
|---|---|---|---|---|---|
| Metal | Slope (decade A cm$^{-2}$V$^{-1}$) | Y-intercept (A cm$^{-2}$) | Slope (decade A cm$^{-2}$ V$^{-1}$) | Y-intercept (A cm$^{-2}$) | V-intersect (V) |
| Ni 625 | −3.68 | −5.37 | −0.98 | −3.94 | −0.54 |
| Ni HX | −3.70 | −5.25 | −0.91 | −3.87 | −0.51 |
| Ni 201 | −2.38 | −4.73 | −0.75 | −3.74 | −0.61 |
| Ni 400 | −2.30 | −4.84 | −0.76 | −3.82 | −0.67 |
| SS 286 | −4.44 | −5.34 | −0.88 | −3.76 | −0.45 |
| SS 304 | −2.18 | −4.53 | −0.64 | −3.66 | −0.56 |
| SS 420 | −2.94 | −4.85 | −0.88 | −3.82 | −0.49 |

TABLE III-continued

| | Low Current Density | | High Current Density | | |
| Metal | Slope (decade A cm$^{-2}$V$^{-1}$) | Y-intercept (A cm$^{-2}$) | Slope (decade A cm$^{-2}$ V$^{-1}$) | Y-intercept (A cm$^{-2}$) | V-intersect (V) |
| --- | --- | --- | --- | --- | --- |
| SS 316 | −2.39 | −4.61 | −6.94 | −3.84 | −0.53 |
| Pt | −4.31 | −5.45 | −0.82 | −3.75 | −0.48 |

Figure 15A:
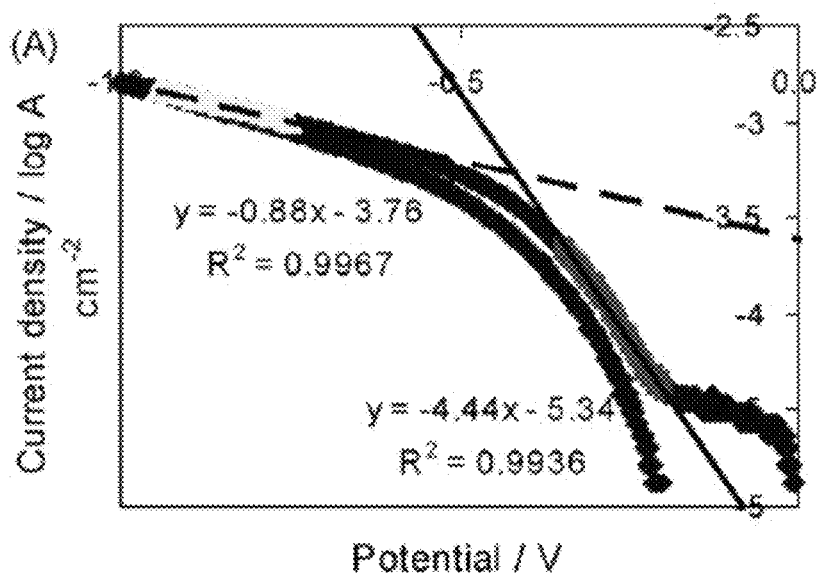
FIG. 15A shows a Tafel plots for an MEC including a stainless steel 286 alloy cathode.
Figure 15B:
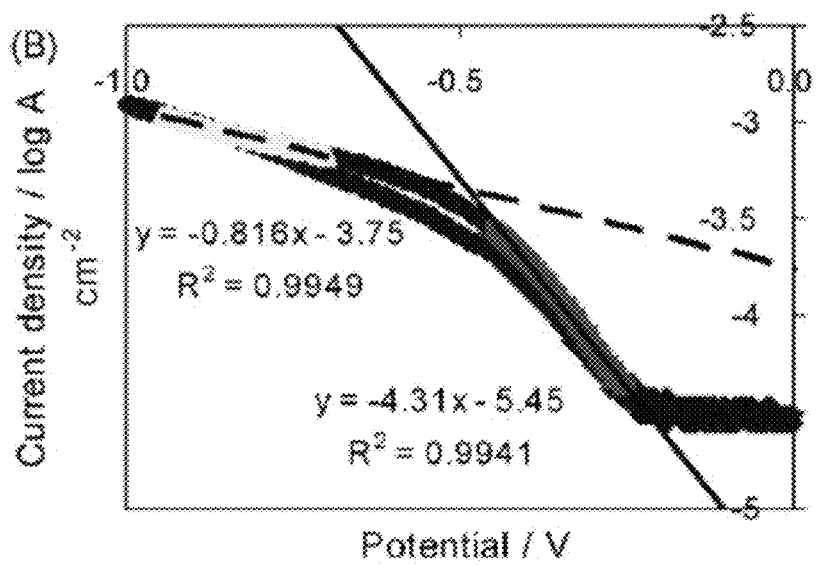
FIG. 15B shows a Tafel plot for an MEC including a platinum metal cathode.

The Tafel plots for SS A286 and platinum are shown as typical examples in FIG. 15, with two linear regions: one at high current densities (solid line) and one at low current densities (dashed line). The larger Tafel slopes and y-intercepts indicate better catalytic performance. The Tafel slope is a function of the transfer coefficient $\alpha_c$ and the number of electrons $n_e$ transferred during the reaction. The y-intercept is controlled by the exchange current density $J_0$. The best cathodes based on Tafel slopes and y-intercepts were SS 286, Ni 625, Ni HX and platinum sheet metal, with slopes ranging from 3.68 to 4.31 decade A cm$^{-2}$ V$^{-1}$ and y-intercepts of 5.25-5.45 A cm$^{-2}$ at low current densities. V-intersect is the voltage at which the linear regressions intersect. Ideally, the MEC should operate at a higher current density for a given overpotential. SS 286 has the lowest V-intersect (0.45 V) of all the metals tested. The ranking of the metal alloys based on electrochemical results thus confirms the same relative performance of the materials observed in MEC tests.

Particles on carbon cloth cathodes compared to metal sheet cathodes. The performance of the platinum sheet metal was compared to the higher surface area platinum particle catalyst bound on carbon cloth usually used in MEC studies. Current densities produced by the platinum sheet metal cathode at an applied voltage of 0.9V (0.59±0.03 mAcm$^{-2}$) were similar to the current densities achieved by the platinum particle bound on carbon cloth at an applied voltage of 0.6V (0.56±0.03mAcm$^{-2}$).

Platinum has been assumed to be the most efficient catalyst for electrohydrogenesis in MECs. The results obtained here, however, show that the performance of platinum can be surpassed by certain stainless steel and nickel alloys. In all cases, for example, SS A286 showed better performance than platinum and the other alloys evaluated in terms of hydrogen gas production, total gas production, cathodic hydrogen recoveries (rH$_2$, cat) and energy recoveries ($\eta$, $\eta_{E+S}$). Furthermore, the volumetric hydrogen production rate (Q) for SS A286 was 4.3 times higher than the SS 316, and 2.2 times better than platinum sheet metal disk. Tafel slopes and intercepts confirmed the superior performance of SS A286 and the general ranking of the other alloys evaluated in MEC tests.

Example 3

Hydrogen production in an MEC using a cathode with electrochemically deposited nickel oxide. The same reactor and conditions were examined as described in Example 2, except here a nickel oxide catalyst was deposited through cathodic electrodeposition onto a sheet metal support using a 12.9 cm$^2$ nickel foam anode. Electrodeposition was achieved by applying 20V at ~2 A for 30 s (1696 power source, B&K Precision, CA) in a solution containing 12 mM NiSO$_4$ and 20 mM (NH$_4$)$_2$SO$_4$ at a pH=2.0 by adding H$_2$SO$_4$. Cyclic voltammetry (CV) scans were performed on the electrodeposited metal to ensure consistent electrodeposition. Tests were conducted in a Lexan cell using a 50 mM phosphate buffer, a Ag/AgCl reference electrode, and a platinum counter electrode (3 cm×5 mm) with a scan range of 0.2 to −1.2V and a scan rate of 3mVs$^{-1}$. Consistent electrodeposition was confirmed as all nickel oxide cathodes had similar hydrogen evolution potentials between −0.65 and −0.70V. The electrodes were subsequently cut to size (3.8 cm diameter disks) and rinsed with deionized water before placing them in the reactors.

Figure 16:
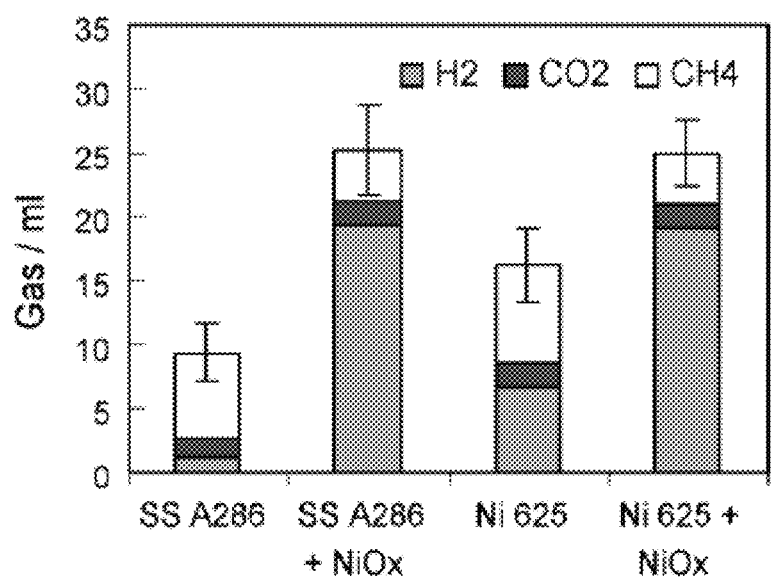
FIG. 16 is a graph showing gas production of MECs including cathodes with or without electrodeposited nickel oxide layers on SS A286 and Ni 625, operated at an applied voltage of 0.6V.

Cathode performance was further improved by electrodepositing a nickel oxide layer on the surface of the sheet metal. For example, gas production increased from 9.4 to 25 ml for SS A286 and from 16.2 to 25 ml for Ni 625 (FIG. 16) at an applied voltage of 0.6 V. Methane gas production was reduced from 6.8 to 4.1 ml for SS A286 and from 7.7 to 4.2 ml for Ni 625. Hydrogen production and recoveries were 4-40 times higher than the original values without the metal oxide (Table IV).

TABLE IV

Summary of MEC results for metal cathodes with electrodeposited nickel oxide layer, compared to platinum, at an applied voltage of 0.6 V.

| Metal | $r_{H2, cat}$ (%) | $r_{H2, COD}$ (%) | $\eta_E$ (%) | $\eta_{E+S}$ (%) | $I_v$ (A/m$^3$) | Q (m$^3$/m$^3$ d) | H$_2$ (%) |
| --- | --- | --- | --- | --- | --- | --- | --- |
| SS A286 | 1.2 ± 0.1 | 1.1 ± 0.1 | 3.1 ± 0.1 | 1.1 ± 0.1 | 71 ± 3 | 0.01 ± 0.001 | 6 ± 1 |
| Ni 625 | 12 ± 5 | 11 ± 4 | 31 ± 13 | 10 ± 4 | 86 ± 3 | 0.1 ± 0.04 | 35 ± 2 |
| Pt | 12 ± 5 | 4 ± 1 | 31 ± 12 | 4 ± 2 | 55 ± 3 | 0.08 ± 0.03 | 36 ± 1 |
| SSA286 + NiO$_x$ | 52 ± 4 | 56 ± 2 | 137 ± 12 | 48 ± 3 | 130 ± 21 | 0.76 ± 0.16 | 76 ± 2 |
| Ni625 + NiO$_x$ | 52 ± 9 | 56 ± 10 | 137 ± 24 | 48 ± 9 | 131 ± 7 | 0.76 ± 0.15 | 76 ± 5 |

Both nickel oxide modified metals reached similar hydrogen production and recovery values, suggesting the sheet metal was less of a factor than the metal oxide surface for performance. For example, energy recovery based on electrical input ($\eta_E$) increased from 3.1% (SS A286) and 31%

Figure 17A:
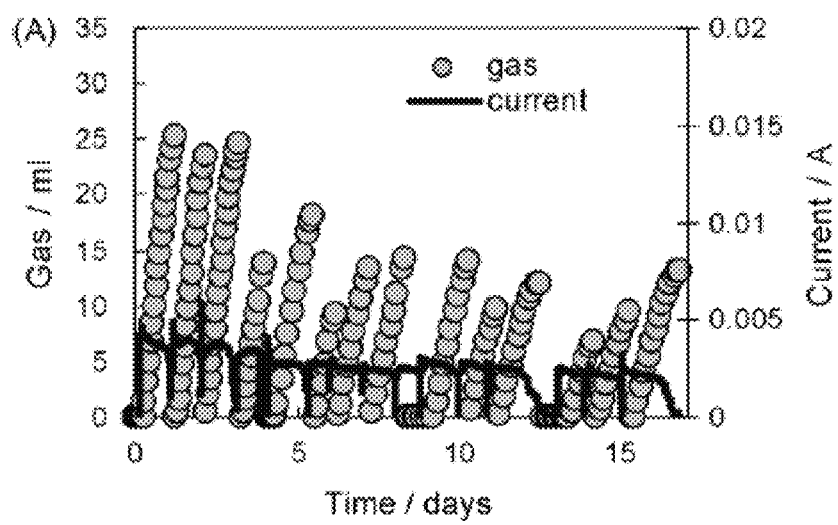
FIG. 17A is a graph showing total gas and current production versus time using a Ni 625+$NiO_x$ cathode.
Figure 17B:
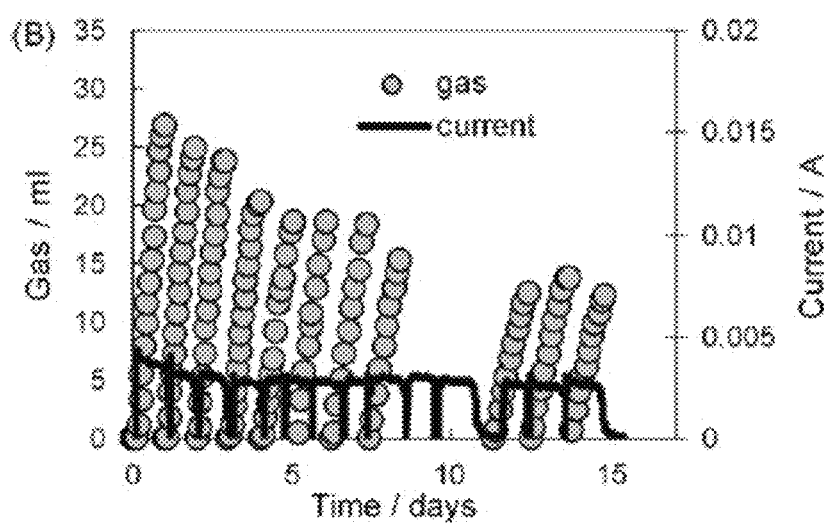
FIG. 17B is a graph showing total gas and current production versus time using a SS A286+$NiO_x$ cathode.

(Ni 625) to 137% for both SS A286 and Ni 625 plus nickel oxide. Volumetric hydrogen production rates (Q) also improved from 0.01 (SS A286) and 0.1 (Ni 625) to 0.76 m3 $H_2m^{-3}$ $day^{-1}$ for both nickel oxide modified metals. In comparison, platinum sheet metal performance at applied 0.6V was similar to the performance of metals without the nickel oxide layer (Table IV): low recoveries ($\eta_E$=31%, $\eta_{E+S}$=4%), low gas production (Q=0.08 $m^3$ $H_2m^{-3}$ $day^{-1}$) and low hydrogen content (H2=36%). Stability of the MECs with nickel oxide cathodes was examined by running the reactors for 15 days (FIG. 17). The initial high gas production and current densities decreased over the first few cycles. Current appeared to stabilize after the first three cycles, while gas production stabilized after seven cycles. The initial decrease in performance was confirmed through changes in the Tafel plot parameters (Table V).

TABLE V

Tafel plots's slope and Y-intercepts for MEC's with and without nickel oxide electrodeposited on Ni 625 and SS 286 alloys

| Metal | Day # | Slope (decade A $cm^{-2}$ $V^{-1}$) | Y-intercept (A $cm^{-2}$) |
|---|---|---|---|
| Ni 625 + $NiO_x$ | 5 | −1.87 | −4.10 |
| Ni 625 + $NiO_x$ | 15 | −1.29 | −4.06 |
| SS 286 + $NiO_x$ | 5 | −1.54 | −3.90 |
| SS 286 + $NiO_x$ | 15 | −1.04 | −3.82 |

There was a 30% decrease in Tafel slope values between day 5 and day 15 (1.87 to 1.29 decade $Acm^{-2}$ $V^{-1}$ for Ni 625+NiOx; 1.54 to 1.04 decade $Acm^{-2}$ $V^{-1}$ for SS 286+NiOx), and a slight decrease in the y-intercept values (4.10 to 4.06 $Acm^2$ for Ni 625+NiOx; 3.90 to 3.82 $Acm^{-2}$ for SS A286+NiOx).

When a nickel oxide layer was applied to the cathode by electrodeposition, current densities, total hydrogen gas production, cathodic recoveries, energy efficiencies, and hydrogen production rates improved by a factor of four. It was also found that the MEC provided good performance, even at the lower applied voltage of 0.6 V. The use of a lower voltage significantly improved the process energy efficiency based on energy input, for example, from $\eta_E$=3.1% (SS A286) and $\eta_E$=31% (Ni 625) to $\eta_E$=137% (nickel oxide on either metal surface).

Example 4

Cathodes

Commercially-available metal powders of nickel (2-10 μm), nickel oxide (≤74 μm), and stainless steel catalysts (≤140 μm) were obtained from Alfa-Aesar, MA. Filamentous nickel powders with smaller particle sizes were obtained from INCO specialty products, NJ (Ni 210: 0.5-1 μm, Ni 110: 1-2 μm and Ni 255: 2.2-2.8 μm; all >99% pure). Cathodes were made by mixing the metal powder with Nafion™ binder (Sigma-Aldrich, MO), and applying the mixture using a brush onto carbon cloth (surface area 7 $cm^2$, 30% wet proof, BASF Fuel Cell, NJ). Platinum catalyst was used as a control (0.002 μm) (10 wt % on Vulcan XC-72; BASF Fuel Cell, NJ).

Nickel oxide was electrodeposited on carbon cloth by applying 20 V at −1.5 A for 40 s (1696 power source, B&K Precision, USA) with an anode stainless steel brush (SS type Cronifer 1925 HMo, made in house) in a solution containing 18 mM $NiSO_4$ and 35 mM $(NH_4)_2SO_4$ at a pH=2.0 (adjusted by adding $H_2SO_4$). Carbon cloth cathodes were prepared before electrodeposition by applying a base coat of carbon black (CB, 5 mg/$cm^2$) and NAFION (33 μL/$cm^2$).

Electrochemical Evaluation of Catalysts

Performance of the cathodes was evaluated by LSV using a potentiostat (PC4/750TM, Echem Analyst, v. 5.5, Gamry Instruments, PA). The cathodes were placed in electrochemical cells (4 cm long by 3 cm diameter) with an Ag/AgCl reference electrode and platinum wire counter electrode in 2 mM phosphate buffer solution (pH 7.0). LSV scans from −0.4 to −1.4 V with IR compensation (to compensate for the ohmic drop between the working and reference electrode) were repeated three times, at a scan rate of 2 mV/s.

MEC Reactor Construction

Single-chamber MECs made of Lexan were 4 cm long containing 3 cm diameter cylindrical-shaped chambers. Anodes were ammonia-treated graphite fiber brushes (25 mm diameter×25 mm length, 0.22 $m^2$ surface area) made with a titanium wire twisted core. The anodes were first enriched with bacteria in microbial fuel cells (MFCs) containing conventional Pt-catalyst air cathodes that were inoculated using a solution from an acetate-fed MFC reactor that had been running for over two years. Duplicate reactors were operated in fed-batch mode using acetate (1 g/L) and a 50 mM phosphate buffer nutrient medium (pH 7) in a 30° C. temperature room. After at least three repeatable cycles, the MFCs were modified to function as MECs by replacing the cathodes and sealing the end of the reactors from air, providing an oxygen-free environment. The voltage needed for MECs was supplied via an external power source (3645A; Circuit Specialists, Inc, Arizona). After each fed batch cycle (when gas production stopped), the reactors were drained, exposed to air for 15 minutes to minimize growth of methanogens (except as noted), refilled with substrate solution, and sparged with ultra high purity nitrogen gas for five minutes. For tests done under complete anaerobic conditions, the reactors were drained and refilled inside an anaerobic glove box ($N_2/H_2$ volume ratio of 95/5). In this case, it was not necessary to sparge the reactors with nitrogen.

Analysis After MEC Cycles

Continuous gas production was measured using a respirometer (AER-200, Challenge Technology, AZ), with the gas collected in gas bags (100 ml capacity, Cali-5 bond, Calibrated Instruments Inc., NY). The composition of the gas in the MEC headspace and gas bags was analyzed using two gas chromatographs (models 8610B and 310, SRI Instruments, CA) with molesieve columns (5A 80/100, Alltech, IL) and thermal conductivity detectors. Argon was used as the carrier gas for $H_2$, $O_2$, $N_2$ and $CH_4$ analysis, and helium was used as the carrier gas for $CO_2$ analysis.

Cathodes were examined using scanning electron microscopy/energy dispersive X-ray spectroscopy (SEM-EDS) at 20 kV (Quanta 200, FEI, OR). Soluble nickel was analyzed via inductively coupled plasma atomic emission spectroscopy (ICP-AES; Optima 5300DV, Perkin-Elmer, MA) at a detection limit of 0.01 ppm. Surface area was obtained by multipoint BET (Brunauer, Emmett, and Teller) based on nitrogen adsorption (ASAP 2020, Micromeritics, GA).

Calculations

The calculated total geometric surface area of the catalyst particles in the cathodes, $A_{b,p}$ ($m^2$), is:

$$A_{b,p} = \frac{A_p m}{V_p \rho_{b,p}} = \frac{4\pi r^2 m}{4/3 \pi r^3 \rho_{b,p}} = \frac{3m}{\rho_{b,p} r} \tag{13}$$

where $A_p$ is the surface area of a single particle; $V_p$ the volume of particles calculated using the average particle radius, r; $\rho_{b,p}$ the bulk density of the particle (provided by the manufacturer); and m the mass of catalyst added to the cathode.

The performance of the MEC reactors was evaluated as described in Example 2: Coulombic efficiency (CE) (%) based on total Coulombs recovered compared to the initial mass of substrate; cathodic hydrogen recovery ($r_{H2,cat}$) (%) or the recovered electrons as hydrogen compared to the current transferred; overall hydrogen recovery ($r_{H2,COD}$) (%), defined as the percentage of hydrogen recovered compared to the theoretical maximum based on added substrate; volumetric current density ($I_V$) (A/m$^3$), calculated from the maximum current production over a 4-hr period normalized to the volume of solution; volumetric hydrogen production rate (Q) (m$^3$ H2/m$^3$ d) based on hydrogen gas produced normalized to the reactor volume; energy recovery relative to electrical input ($\eta_E$) (%); and overall energy recovery ($\eta_{E+S}$) (%) based on both electrical input and heat of combustion of the substrate ($\Delta H_{facetate}$=870.28 kJ/mol).

Cathode Selection by LSV

An MEC with a Pt catalyst typically produces 4-6 mA, or 0.6-0.9 mA/cm$^2$ (7 cm$^2$ cathode projected surface area). Overpotentials for metal catalysts of different sizes and loadings, and with different amounts of binder, were compared at a current density in this range (−0.63 mA/cm$^2$=−3.2 log A/cm$^2$) to better predict their performance relative to MEC conditions. Table VI shows overpotentials vs SHE at current density of −3.2 log A/cm$^2$ for cathodes during third LSV scan at 2 mV/s. The surface area indicated in Table VI was calculated using equation (13).

TABLE VI-continued

| Catalyst | Particle size (μm) | Surface Area (m$^2$) | Qty (mg) | CB (mg) | Nafion (μL) | Potential (V) |
|---|---|---|---|---|---|---|
| SS 316 | 150 | 0.002 | 120 | 0 | 400 | −0.863 |
| SS 410 | 150 | 0.002 | 120 | 0 | 400 | −0.913 |
| SS 304 | 150 | 0.002 | 120 | 0 | 400 | −0.813 |
| SS 303 | 150 | 0.002 | 120 | 0 | 400 | −0.953 |

NA—not applicable, ND—not determined.

Figure 18:
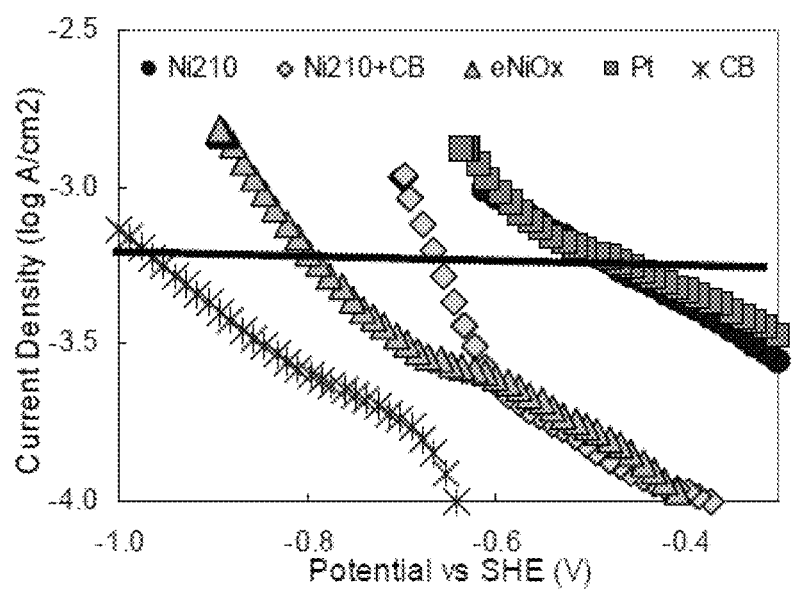
FIG. 18 shows Tafel plots for the indicated MEC cathodes in 2 mM phosphate buffer, scan rate 2 mV/s, third scan.

Both Ni 210 on carbon cloth (60 mg Ni, 267 μL Nafion) and the standard Pt cathode (10 mg Pt, 400 μL Nafion) had the same low overpotential of −0.500 V at this current density. Current densities produced with these two materials were also very similar over the complete range of applied voltages as shown in FIG. 18.

MEC Performance

The two metal powder and binder combinations that produced the lowest overpotentials in LSV scans (Ni 210 with 267 μL Nafion, and Ni 210+CB with 400 μL Nafion) (Table VI) were used as cathodes in MECs, and their performance was compared to the same reactors with Pt cathodes. Electrodeposited nickel oxide (eNiOx) was also used as an MEC cathode. The resulting BET total surface areas were 4.31 m$^2$/g (Ni 210), 11.8 m$^2$/g (Ni210+CB), 17.3 m$^2$/g (eNiOx), and 11.2 m$^2$/g (Pt).

Volumetric Gas Production and Composition

Figure 19A:
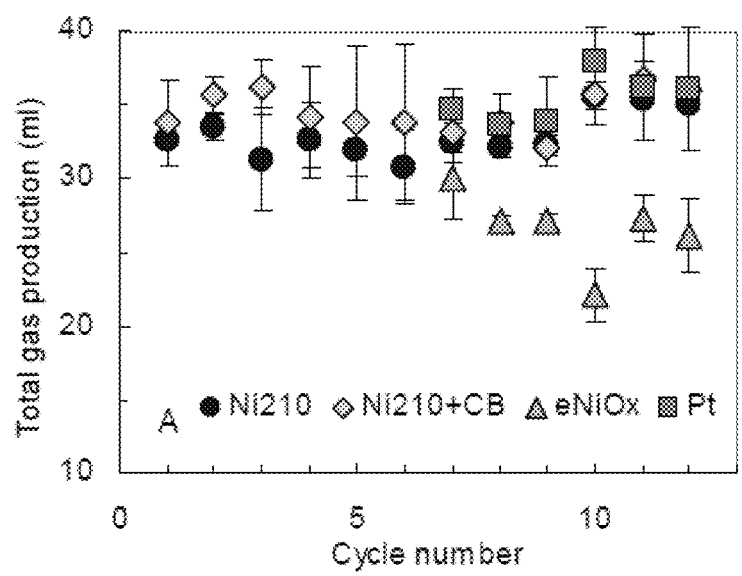
FIG. 19A is a graph showing total gas production for MECs with Ni210, Ni210+CB, eNiOx or Pt catalyst cathodes, as a function of cycle number at an applied voltage of 0.6 V.
Figure 19B:
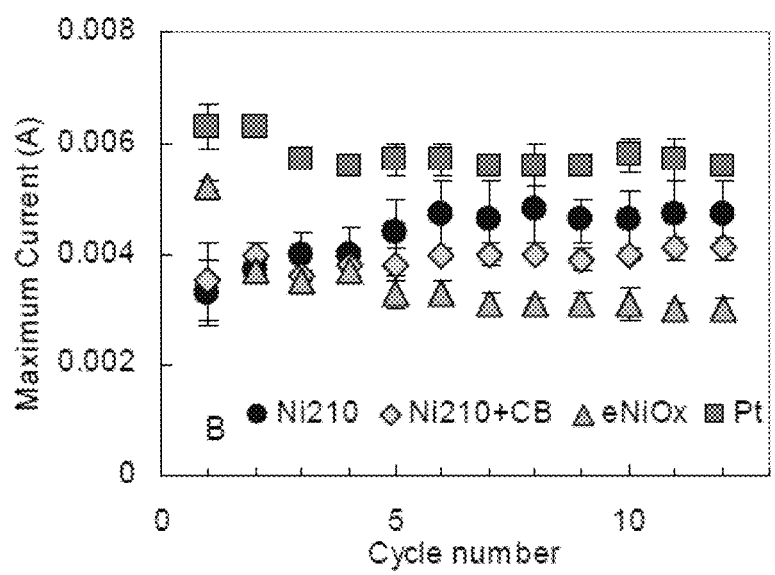
FIG. 19B is a graph showing maximum current for MECs with Ni210, Ni210+CB, eNiOx or Pt catalyst cathodes, as a function of cycle number at an applied voltage of 0.6 V.

Table VII and FIGS. 19A and 19B show volumetric gas production, gas composition and current production for MECs using nickel cathodes, Ni 210, Ni 210+CB or eNiOx compared with Pt cathodes.

TABLE VII

Summary of MEC results for Ni210, Ni210 + CB, eNiOx and Pt catalyst cathodes at an applied voltage of 0.6 V, eighth cycle of operation.

| Metal | H$_2$ (%) | Iv (A/m$^3$) | Q (m$^3$/m$^3$d) | CE (%) | $r_{H2, cat}$ (%) | $r_{H2, COD}$ (%) | $\eta_E$ (%) | $\eta_{E+S}$ (%) |
|---|---|---|---|---|---|---|---|---|
| Ni210 | 92 ± 0 | 160 ± 31 | 1.3 ± 0.3 | 92.7 ± 15.8 | 79 ± 10 | 73 ± 3 | 210 ± 40 | 65 ± 2 |
| Ni210 + CB | 92 ± 1 | 139 ± 2 | 1.2 ± 0.1 | 83.8 ± 1.2 | 94 ± 5 | 79 ± 5 | 252 ± 12 | 73 ± 4 |
| eNiOx | 94 ± 0 | 103 ± 4 | 0.9 ± 0.1 | 87.1 ± 2.3 | 86 ± 1 | 75 ± 1 | 215 ± 8 | 67 ± 0 |
| Pt | 92 ± 2 | 186 ± 4 | 1.6 ± 0.0 | 85.0 ± 6.4 | 89 ± 7 | 75 ± 0 | 239 ± 21 | 70 ± 2 |

TABLE VI

| Catalyst | Particle size (μm) | Surface Area (m$^2$) | Qty (mg) | CB (mg) | Nafion (μL) | Potential (V) |
|---|---|---|---|---|---|---|
| NONE (CB) | NA | 0.00 | 0 | 60 | 400 | −0.970 |
| Platinum | 0.002 | 1.45 | 10 | 50 | 400 | −0.500 |
| Ni 210 | 0.5-1 | 0.60 | 60 | 0 | 267 | −0.500 |
| Ni 210 | 0.5-1 | 0.60 | 60 | 0 | 300 | −0.583 |
| Ni 210 | 0.5-1 | 0.60 | 60 | 0 | 325 | −0.713 |
| Ni 210 | 0.5-1 | 0.60 | 60 | 0 | 375 | −0.713 |
| Ni 210 | 0.5-1 | 0.60 | 60 | 0 | 400 | −0.720 |
| Ni 210 | 0.5-1 | 0.60 | 60 | 30 | 400 | −0.668 |
| Ni 110 | 1-2 | 0.17 | 60 | 30 | 400 | −0.720 |
| Ni 255 | 2.2-2.8 | 0.23 | 60 | 30 | 400 | −0.721 |
| Ni 10255 | 2.2-3 | 0.24 | 60 | 30 | 400 | −0.760 |
| Ni 10256 | 3-7 | 0.03 | 60 | 30 | 400 | −0.739 |
| Ni 210 | 0.5-1 | 0.45 | 30 | 0 | 400 | −0.747 |
| Ni 210 | 0.5-1 | 1.35 | 90 | 0 | 400 | −0.727 |
| Ni 210 | 0.5-1 | 0.45 | 30 | 30 | 400 | −0.683 |
| Ni 10255 | 2.2-3 | 0.23 | 60 | 0 | 400 | −0.760 |
| Ni 10256 | 3-7 | 0.03 | 60 | 0 | 400 | −0.740 |
| NiO 87302 | 74 | 0.001 | 60 | 0 | 400 | −1.110 |
| eNiOx | | 0.001 | ND | ND | 60 | 400 | −0.800 |
| SS 316 | 16 | 0.01 | 60 | 0 | 400 | −1.140 |

MEC Performance with Ni210 Cathodes as a Function of Applied Voltage

Figure 20A:
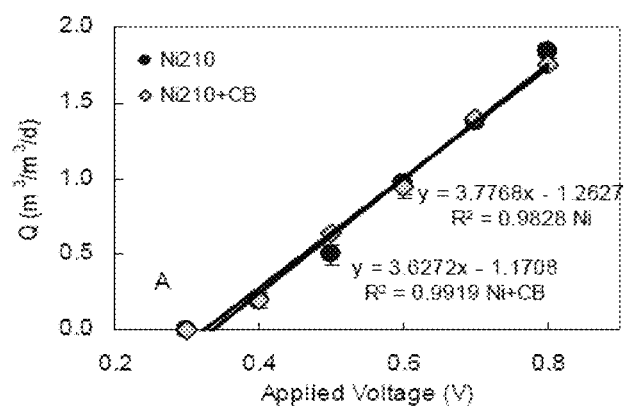
FIG. 20A is a graph showing hydrogen production rate in an MEC using a Ni210 catalyst cathode at different applied voltages.
Figure 20B:
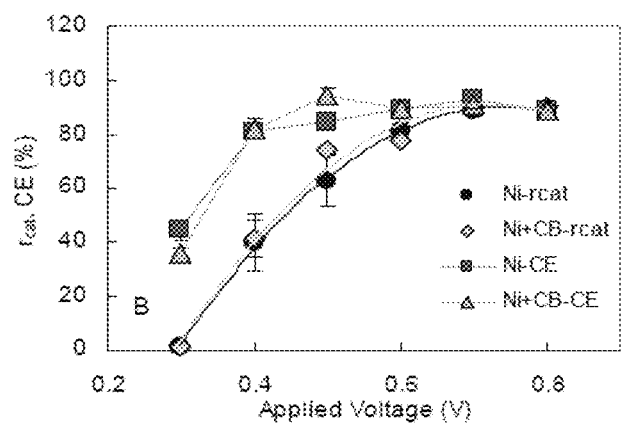
FIG. 20B is a graph showing cathodic recovery and Coulombic efficiency in an MEC using a Ni210 catalyst cathode at different applied voltages.
Figure 20C:
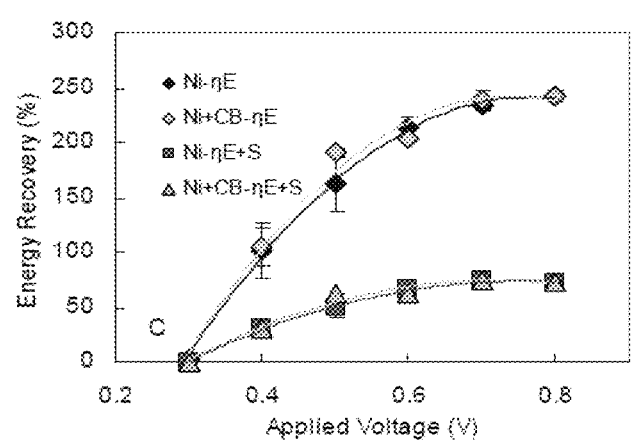
FIG. 20C is a graph showing energy recovery based on electrical input and overall energy recovery in an MEC using a Ni210 catalyst cathode at different applied voltages.

Hydrogen production rates with the two Ni cathodes increased with applied voltage and were not significantly different from each other, with the largest rates produced at the highest applied voltage of 0.8 V (Q=1.85 m$^3$/m$^3$/d, Ni 210) (FIG. 20A). There was no hydrogen production with the Ni catalysts at an applied voltage of 0.3 V. Coulombic efficiencies (CE) decreased slightly with applied voltage (89% at 0.8 V, to 81% at 0.4 V) (FIG. 20B). Cathodic hydrogen recovery reached a maximum at 0.7 V (Ni 210=93%, Ni 210+CB=91%). Similarly, energy recovery based on electrical input ($\eta_E$) and overall energy recovery ($\eta_{E+S}$) increased with increasing applied voltage, with the maximum values for $\eta_E$ at 0.8 V of 240%, and for 1+S at 0.7 V of 74%.

Example 5

Figure 21:
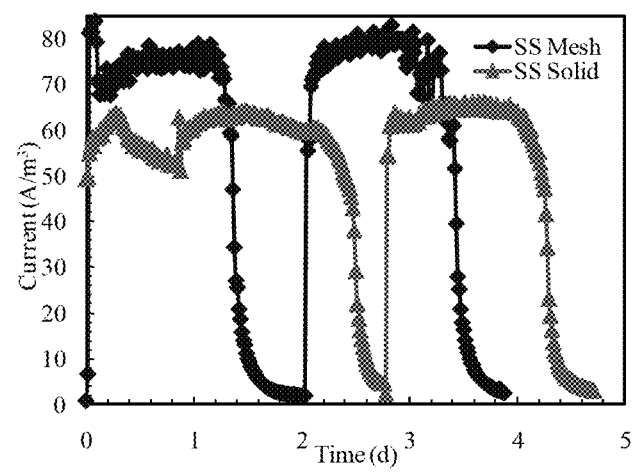
FIG. 21 shows current density as a function of time for both SS mesh and SS solid cathodes in an MEC at $E_{AP}$=0.6 V.

Hydrogen production in an MEC using a cathode with a mesh structure. Hydrogen production in an MEC using a cathode with a mesh structure. Preliminary tests conducted with SS mesh are shown in FIG. 21. A single-chamber MEC made of Lexan was 4 cm long containing a 3 cm diameter cylindrical-shaped chamber with a graphite fiber brush anode, and using a 50 mM phosphate buffer solution and a fuel of 1 g/L sodium acetate. The cathode was either a flat sheet of SS305 (7 cm2) or SS mesh made of the same material. The mesh cathode produced nearly 80 $A/m^3$ compared to ~65 $A/m^3$ for the flat sheet. Thus, the use of the higher surface area mesh produced more current than a flat sheet of the same material in an MEC.

Example 6

The cathodes include a current collector (stainless steel mesh, SS), catalyst (Pt), and diffusion layer (poly(dimethylsiloxane), PDMS) in one single cathode structure. The SS mesh used in this example (type 304 SS, 90×90, woven wire diameter 0.0055 inches, McMaster-Carr, OH) had 90×90 openings per square inch. PDMS was made using a 10:1 mixture of SYLGARD 184 silicone elastomer base and SYLGARD 184 silicone elastomer curing agent (Dow Corning, MI), that was further diluted to 10 wt % with toluene to decrease the solution viscosity. The PDMS ($6.25 \times 10^{-3}$ $mg/cm^2$) was applied with carbon black (1.56 $mg/cm^2$) to the side of the SS that faced the air. After applying this first PDMS/carbon black as a base layer, one to four additional diffusion layers (DLs) containing PDMS/carbon black or only PDMS were applied on top of this base diffusion layer at the same mass loading as the base diffusion layer. After applying each diffusion layer, cathodes were air dried for 2 hours, and then heated at 80° C. for 30 min to crosslink the PDMS oligomers. After applying these DLs, a Pt catalyst layer (5 $mg/cm^2$ 10% Pt on Vulcan XC-72 with 33.3 $\mu L/cm^2$ of 5 wt % Nafiton as binder) was applied to the SS mesh on the side facing the solution and the coated cathode was dried for at least 1 day at room temperature before being used. Cathodes were also prepared with no coating on the solution-facing side of mesh, or with only a carbon black layer (both with 2 PDMS/carbon DLs on the air side).

Carbon cloth (E-Tek, Type B, 30% wet proofing, BASF Fuel Cell, Inc. NJ) was also tested as a cathode supporting material. One or more DLs of PDMS/carbon and the Pt catalyst were applied as described above for the metal mesh cathode.

MFC Construction and Operation.

MFCs were single-chamber cubic-shaped reactors constructed as described in Example 2 with an anode chamber 4 cm long and 3 cm in diameter. The anode was an ammonia gas treated graphite fiber brush (25 mm diameter×25 mm length; fiber type PANEX 33 160K, ZOLTEK (continuous carbon fiber manufactured from polyacrylonitrile (PAN) precursor having fiber diameter 7.2 μm (0.283 mil), no twist, 117,472 Denier (g/9000 m), 77 m/kg (114 ft/lb) yield and 0.06493 $cm^2$ (0.01006 $in^2$) average tow cross sectional area). All reactors were inoculated using a solution from an MFC operated for over 1 year (initially inoculated from the effluent of the primary clarifier of the local wastewater treatment plant). The medium contained acetate as the fuel (0.5 g/L for fixed resistance tests, and 1.0 g/L for polarization tests), and a phosphate buffer nutrient solution (PBS; conductivity of 8.26 mS/cm) containing: $Na_2HPO_4$, 4.58 g/L; $NaH_2PHO_4$—$H_2O$ 2.45 g/L; $NH_4Cl$ 0.31 g/L; KCl 0.13 g/L; trace minerals (12.5 mL/L) and vitamins (5 mL/L). Reactors were all operated in fed-batch mode at 30° C. and were refilled each time when the voltage decreased to less than 20 mV forming one complete cycle of operation.

Calculations and Measurements

Voltage (E) across the external resistor (1 kΩ, except as noted) in the MFC circuit was measured at 20 min intervals using a data acquisition system (2700, Keithley Instrument, OH) connected to a personal computer. Current (I=E/R), power (P=IE) were calculated as described in Logan, B. et al, Environmental Science & Technology, 2006, 40:5181-5192, with the current density and power density normalized by the projected surface area of the cathode. To obtain the polarization and power density curves as a function of current, external circuit resistances were varied from 1000 to 50 Ω in decreasing order. Each resistor was used for a full fed-batch cycle, and the COD of the solution at the end of the cycle was measured using standard methods such as described in Standard Methods for the Examination of Water and Wastewater, 21st. ed.; American Public Health Association: New York, 2005. The CE was calculated based on total COD removal over the cycle, as described Logan, B. et al, Environmental Science & Technology, 2006, 40:5181-5192.

Linear sweep voltammetry (LSV) was used to assess electrochemical performance of the cathodes. Current was measured in 50 mM PBS in the absence of nutrients and exoelectrogens using a potentiostat (PC4/750, Gamry Instruments). A two chamber electrochemical cell with each chamber 2 cm in length and 3 cm in diameter separated by an anion exchange membrane (AMI-7001, Membrane International Inc., NJ) was used for measurements, consisting of a working electrode (cathode with 7 $cm^2$ projected surface area), counter electrode (Pt plate with a projected surface area of 2 $cm^2$), and an Ag/AgCl reference electrode (RE-5B; BASi, West Lafayette, Ind.). The scan rate was 1 mV/s, and potential was scanned from +0.3 V to −0.2 V (vs. Ag/AgCl).

Oxygen permeability was measured in terms of oxygen transfer coefficient as described in Cheng, S. et al, Electrochemistry Communications, 2006, 8:489-494. The 4-cm cubical reactor used in MFC tests was used for oxygen transport measurements. Dissolved oxygen concentrations were measured using a non-consumptive dissolved oxygen probe (FOXY, Ocean Optics, Inc., Dunedin, Fla.).

Performance of SS Mesh Cathodes in MFCs Compared with Carbon Cloth Cathodes

MFCs with SS mesh or carbon cloth cathodes and a Pt catalyst rapidly produced voltage after inoculation, and generated stable voltages at a fixed resistance. Differences in voltage among these reactors at a high external resistance of 1 kΩ were small, although in general the SS mesh produced higher voltages than the carbon cloth cathodes.

Figure 22:
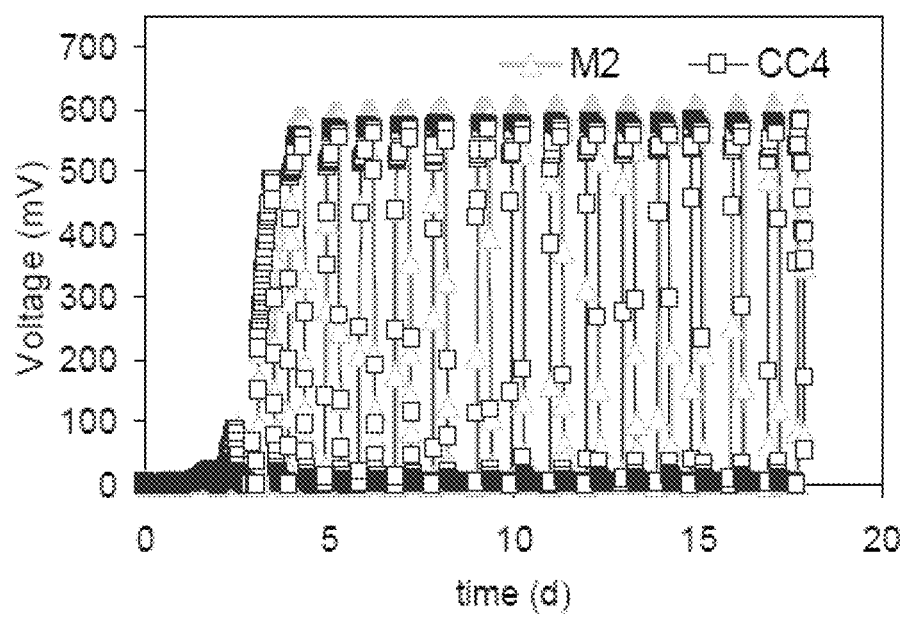
FIG. 22 is a graph showing voltage generation in an MFC using a SS mesh cathode and a Pt catalyst with 2 PDMS/carbon diffusion layers (M2) compared to an MFC using carbon cloth cathodes with 4 diffusion layers (CC4)

FIG. 22 is a graph showing voltage generation in an MFC using a SS mesh cathode and a Pt catalyst with 2 PDMS/carbon diffusion layers (M2) compared to an MFC using carbon cloth cathodes with 4 diffusion layers (CC4); using 50 mM PBS buffer and 0.5 g/L sodium acetate. FIG. 22 shows that the largest maximum voltage that was produced over a total of 14 batch cycles of operation was of 602+5 mV (±S.D., n=14 cycles) obtained using the SS mesh cathode with 2 PDMS/carbon layers. In contrast, the highest value of carbon cloth cathodes was 585±4 mV for MFCs with 4 PDMS/carbon layers.

Figures 23A, 23B:
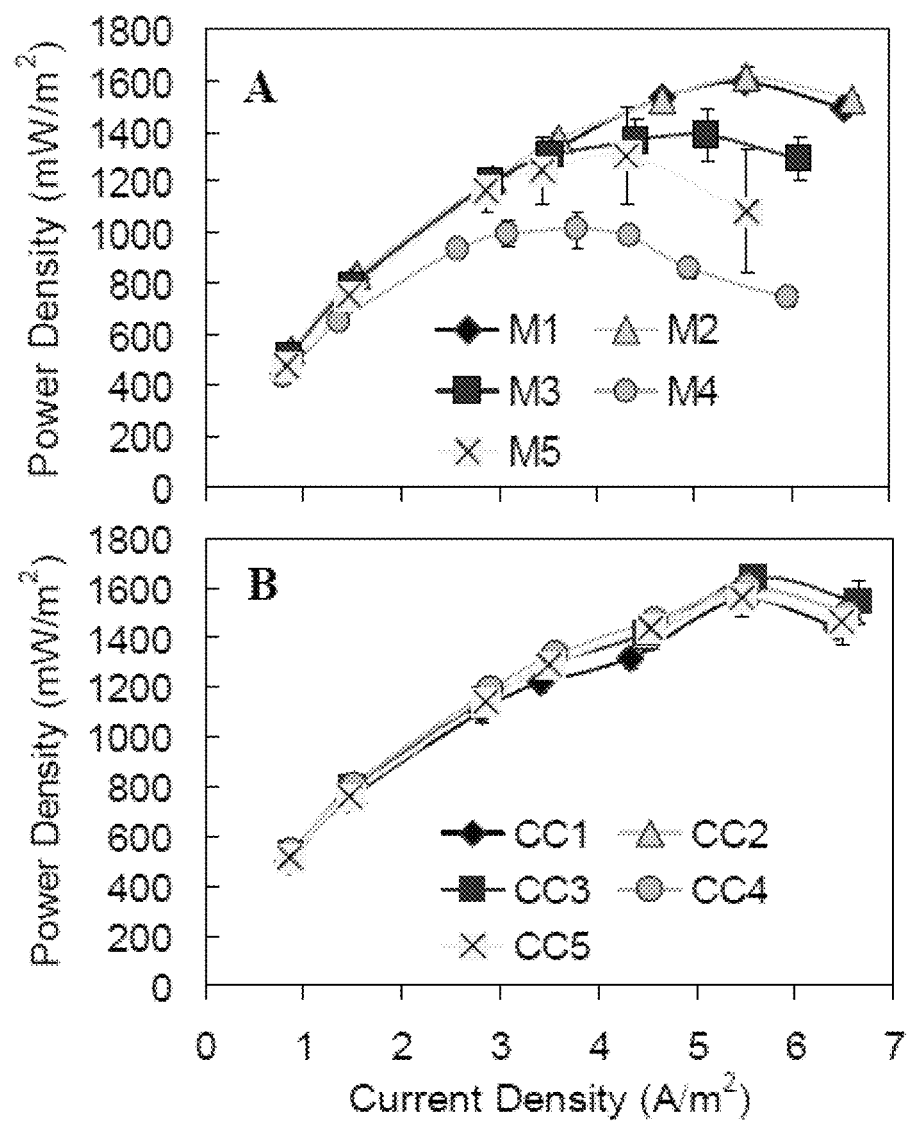
FIG. 23A is a graph showing power density in an MFC using a cathode containing SS mesh with Pt catalyst and 1-5 layers of PDMS/carbon DLs (M1-M5) as a function of current density (normalized to cathode surface area) obtained by varying the external circuit resistance (1000-50Ω)
FIG. 23B is a graph showing power density in an MFC using carbon cloth cathodes with Pt and the same DLs (CC1-CC5) as a function of current density (normalized to cathode surface area) obtained by varying the external circuit resistance (1000-501)

FIG. 23A is a graph showing power density in an MFC using a cathode containing SS mesh with Pt catalyst and 1-5 layers of PDMS/carbon DLs (M1-M5) as a function of current density (normalized to cathode surface area) obtained by varying the external circuit resistance (1000-50Ω). FIG. 23B is a graph showing power density in an MFC using carbon cloth cathodes with Pt and the same DLs (CC1-CC5) as a function of current density (normalized to cathode surface area) obtained by varying the external circuit resistance (1000-50Ω). Error bars±SD in FIGS. 23A and 23B are based on measurement of two duplicate reactors. Large differences in power production were observed based on polarization data. The largest maximum power density using a SS mesh cathode of 1610 t 56 mW/m$^2$ (±S.D. for duplicate reactors) was achieved with 2 PDMS/carbon layers. This was similar to that produced with a single layer (1592±19 mW/m$^2$), but three or more layers decreased performance to as little as 1010 mW/m$^2$ (FIG. 23A). Maximum power densities produced using carbon cloth cathodes with PDMS/carbon layers varied over a smaller range of 1553±19 mW/m$^2$ (1 DL) to 1635±62 mW/m$^2$ (3 DLs) (FIG. 23B). Thus, there was much less of an effect of the number of layers on power generation with the carbon cloth material than with the SS mesh.

Performance of SS mesh cathodes in electrochemical tests.

Figures 24A, 24B, 24C:
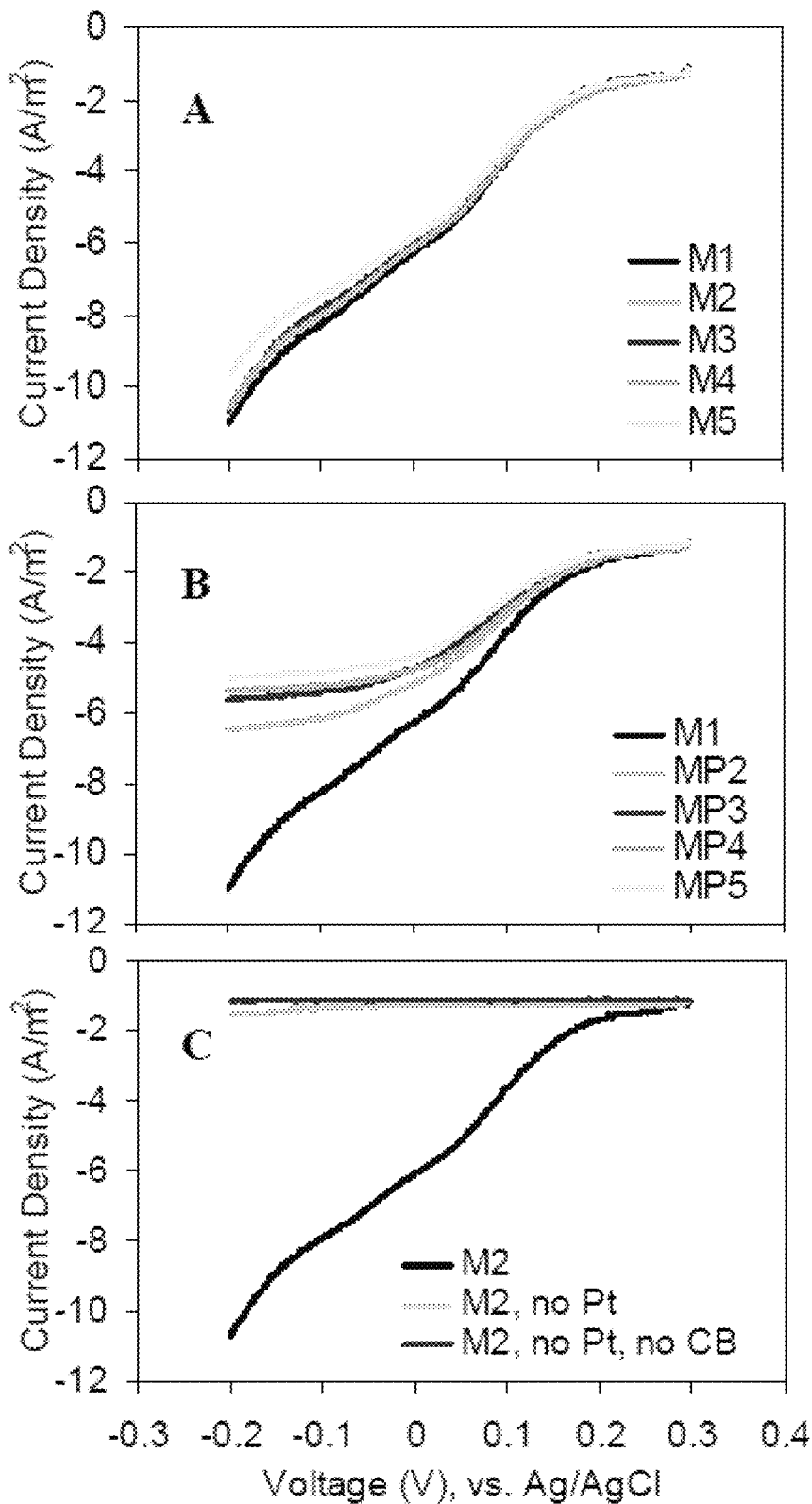
FIG. 24A is a graph showing LSV of MFCs including SS mesh cathodes with a Pt catalyst and 1-5 PDMS/carbon DLs (M1-M5)
FIG. 24B is a graph showing LSV of an MFC including cathode M1 compared with MFCs including cathodes having additional PDMS layers (MP2-MP5), each including Pt catalyst.
FIG. 24C is a graph showing LSV of an MFC including cathode M2 compared with an MFC including a cathode having a solution-facing side coating containing only carbon black (M2, no Pt), and a cathode with no coating on the solution-facing side (M2, no Pt, no CB)

LSV tests were conducted using SS mesh cathodes to evaluate the electrochemical performance of the cathodes in the absence of bacteria. FIG. 24A is a graph showing LSV of MFCs including SS mesh cathodes with a Pt catalyst and 1-5 PDMS/carbon DLs (M1-M5). FIG. 24B is a graph showing LSV of an MFC including cathode MI compared with MFCs including cathodes having additional PDMS layers (MP2-MP5), each including Pt catalyst. FIG. 24C is a graph showing LSV of an MFC including cathode M2 compared with an MFC including a cathode having a solution-facing side coating containing only carbon black (M2, no Pt), and a cathode with no coating on the solution-facing side (M2, no Pt, no CB).

All voltammograms with the SS mesh cathodes containing a Pt catalyst and 1-5 PDMS/carbon layers had similar current densities at a given applied voltage (FIG. 24A). The cathode which had the largest current response had only 1 PDMS/carbon base layer. Current densities with the SS mesh cathodes with 2-4 layers had only slightly reduced activities compared to the single PDMS/carbon base layer. This suggests that the different performance of the SS mesh cathodes with a different number of DLs in MFC tests was not due to their inherent electrochemical properties, but rather other effects such as development of a cathode biofilm or oxygen intrusion through the DLs and the effects on the bacteria in the anode chamber.

Voltammograms were also conducted using the SS mesh containing only PDMS (no carbon black) applied to the PDMS/carbon base layer. These cathodes with one to four additional PDMS layers showed poorer electrochemical performance, and had a much wider range in electrochemical performance, than the SS cathodes with both PDMS and carbon (FIG. 24B). With only PDMS, electrochemical performance decreased with the additional layers. This indicates that the carbon black material is needed with PDMS to ensure good electrochemical performance. When cathodes with 2 PDMS/carbon DLs were examined using LSV that had only carbon black on the side of the SS mesh facing solution (no Pt), there was little current over the range of voltages examined (FIG. 24C). In addition, cathodes prepared without carbon black or Pt were similarly ineffective at oxygen reduction. These results show that the SS and carbon black did not detectably catalyze oxygen reduction.

Figures 25A, 25B:
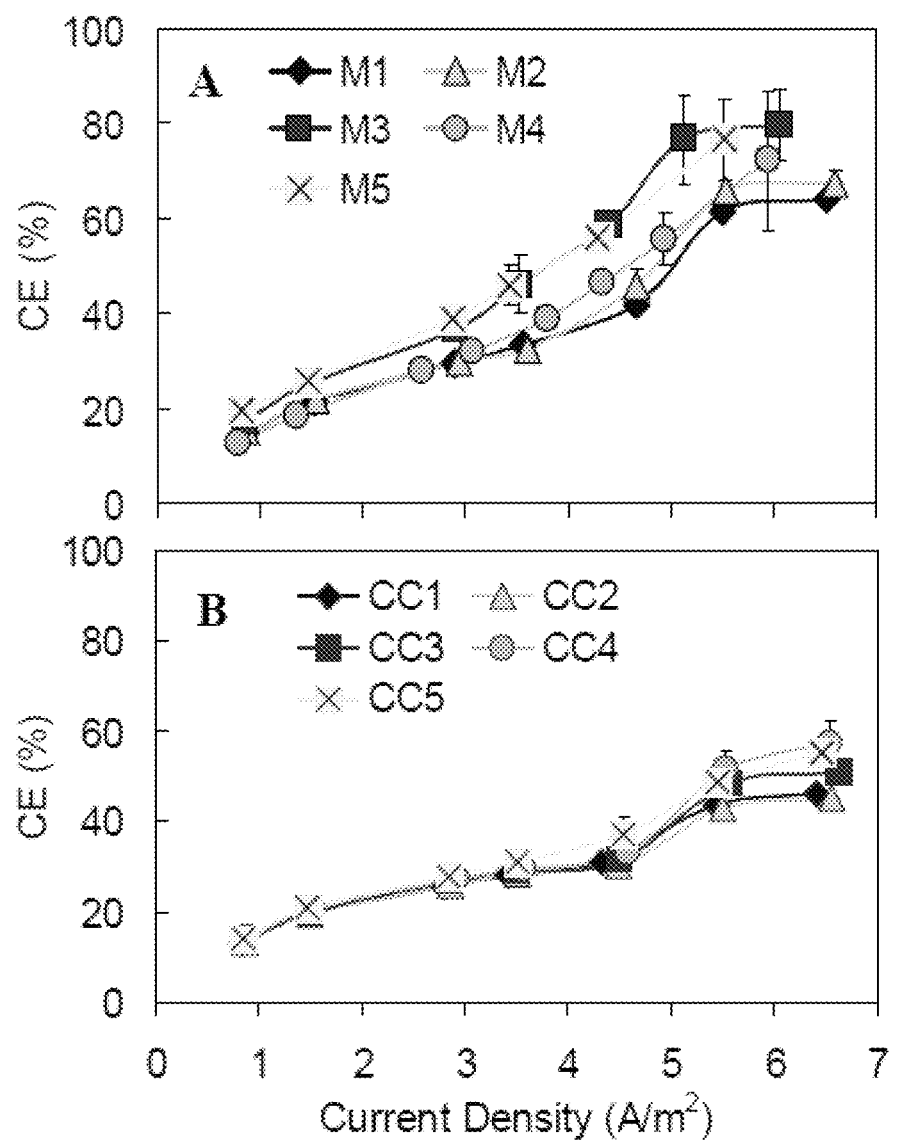
FIG. 25A is a graph showing the CE of an MFC including a SS mesh cathode with Pt catalyst and 1-5 layers of PDMS/carbon DLs (M1-M5) as a function of current density (normalized to cathode surface area) obtained by varying the external circuit resistance (1000-50Ω)
FIG. 25B is a graph showing the CE of MFCs including carbon cloth cathodes with Pt and 1-5 layers of PDMS/carbon DLs (CC1-CC5) as a function of current density (normalized to cathode surface area) obtained by varying the external circuit resistance (1000-500)

MFC tests with SS mesh cathodes in general produced much higher Coulombic efficiencies (CEs) than those with carbon cloth cathodes. FIG. 25A is a graph showing the CE of an MFC including a SS mesh cathode with Pt catalyst and 1-5 layers of PDMS/carbon DLs (M1-M5) as a function of current density (normalized to cathode surface area) obtained by varying the external circuit resistance (1000-50Ω). FIG. 25B is a graph showing the CE of MFCs including carbon cloth cathodes with Pt and 1-5 layers of PDMS/carbon DLs (CC1-CC5) as a function of current density (normalized to cathode surface area) obtained by varying the external circuit resistance (1000-50Ω). Error bars±SD in FIGS. 25A and 25B are based on measurement of two duplicate reactors. In each of these cases, the CE increased with current density. CEs of the SS mesh cathode ranged from 15% to 64% with single PDMS/carbon base layer, and only slightly increased when adding the second layer. The highest CE of 80% was obtained when 3 DLs were applied to this cathode. In contrast, the carbon cloth cathodes CEs ranged from 13 to 46% with the first DL, with the highest value of 57% with 4 DLs. COD removals over a cycle of operation ranged from 90% to 95%, and there was no effect of the number of DLs or the type of material (SS or carbon cloth) on COD removal.

Oxygen Permeability of the Cathodes.

Figure 26:
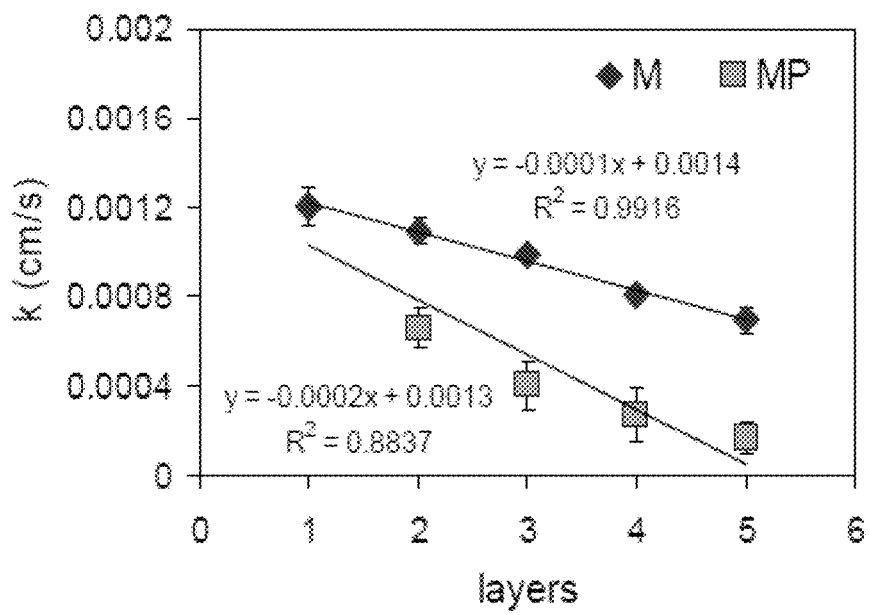
FIG. 26 is a graph showing oxygen permeability of SS mesh cathodes including a Pt catalyst and PDMS/carbon DLs (M) or PDMS (MP) DLs upon PDMS/carbon base layer.

PDMS is relatively permeable to oxygen, but increasing the number of PDMS diffusion layers should reduce oxygen transfer due to the increased thickness of the DL. FIG. 26 is a graph showing oxygen permeability of SS mesh cathodes including a Pt catalyst and PDMS/carbon DLs (M) or PDMS (MP) DLs upon PDMS/carbon base layer. Error bars±SD in FIG. 26 are based on two or more measurements. With one base layer of PDMS/carbon on the SS mesh cathode, the oxygen mass transfer coefficient was $1.2\pm0.1\times10^{-3}$ cm/s. Successive application of multiple PDMS/carbon DLs decreased the oxygen mass transfer coefficient from $1.1\pm0.1\times10^{-3}$ cm/s (2 layers) to $0.7\pm0.1\times10^{-3}$ cm/s (5 layers) (FIG. 26). Addition of only PDMS (no carbon) onto this base layer decreased the mass transfer coefficient to 0.7 f 0.1× $10^{-3}$ cm/s, with the lowest value of $0.2\pm0.1\times10^{-3}$ cm/s obtained with four pure PDMS layers. Thus, the addition of carbon with PDMS created a more oxygen permeable material than the PDMS alone. A carbon cloth cathode with 4 PTFE layers obtained an oxygen transfer coefficient of $1.1\pm0.1\times10^{-3}$ cm/s.

Water Losses

The addition of a PDMS layer was important for controlling water losses from the cathode. SS mesh cathode with the base PDMS/carbon layer had an initial water evaporation loss of 5% of the water in the anode chamber each day. Water losses decreased with additional DLs, and were not detectable for cathodes with five DLs. For carbon cloth cathodes, the water losses were larger, with 10% to 5% per day with one to five DLs. However, as a biofilm developed on the cathodes after several cycles, water loss gradually decreased for both SS and carbon cloth cathodes by about 20-30%.

As shown herein, PDMS mixed with carbon black is effective at reducing water losses and allowing oxygen transfer to the cathode catalyst. Use of a SS mesh cathode with two PDMS/carbon layers, resulted in a maximum power density of 1610 t 56 mW/m$^2$ (47.0±1.6 W/m$^3$). In comparison, the best performance with a carbon cloth cathode was 1635±62 mW/m$^2$ with three PDMS/carbon layers. The recovery of the substrate as current was also improved using SS mesh cathodes, with CEs ranging from 15-67% for the SS cathodes, compared to 14-51% for the carbon cloth cathodes for the above two cases.

The combination of SS mesh and PDMS/carbon DLs produced a structure that had an improved CE compared to previously examined materials, likely as a result of higher current densities and reduced oxygen transfer coefficients. SS mesh cathodes had a CE as high as 80% with 3 PDMS/carbon DLs, over a current density range of 0.8-6.6

A/m². Carbon cloth cathodes with the same DL had CEs that ranged from 13% to 57% over similar current densities. These CEs can be compared with those of carbon cloth cathodes with 4 PTFE DLs that had CEs ranging from 20% to 27% at current densities of 0.8-2.5 A/m² using a flat carbon cloth anode, and from 40% to 60% at 0.8-11 A/m² using a graphite fiber brush anode. A comparison of these results suggests that high CEs achieved with the SS mesh cathodes are partly due to high current densities. When the current density is increased, the cycle time is reduced, and thus the amount of oxygen that can diffuse into the reactor is substantially reduced in proportion to the cycle time. However, even in the high current density range of >5 A/m², SS mesh cathode had a higher maximum CE than other materials, likely due to the lower oxygen permeability of the mesh DL.

Example 7

Electricity generation in an MFC using a tubular cathode made of stainless steel mesh.

For this example, a cube-shaped MFC reactor with a cylindrical tube center is used, with the electrodes placed on either side of the reactor. The anode was an ammonia gas treated graphite fiber brush (1.4 cm diameter×2.5 cm length, fiber type: PANEX® 33 160K, ZOLTEK) with a surface area of 1300 cm² (95% porosity) placed in the center of the reactor. The cathode was SS mesh of mesh size 50 or 70, containing a catalyst layer of Pt. For these experiments several diffusion layers (DLs), in this case made of polytetrafluoroethylene (PTFE), were placed on the air-facing side on a carbon/PTFE base layer. The voltage produced was approximately 500 mV, which compared favorably to carbon paper in this type of MFC design.

Figure 27:
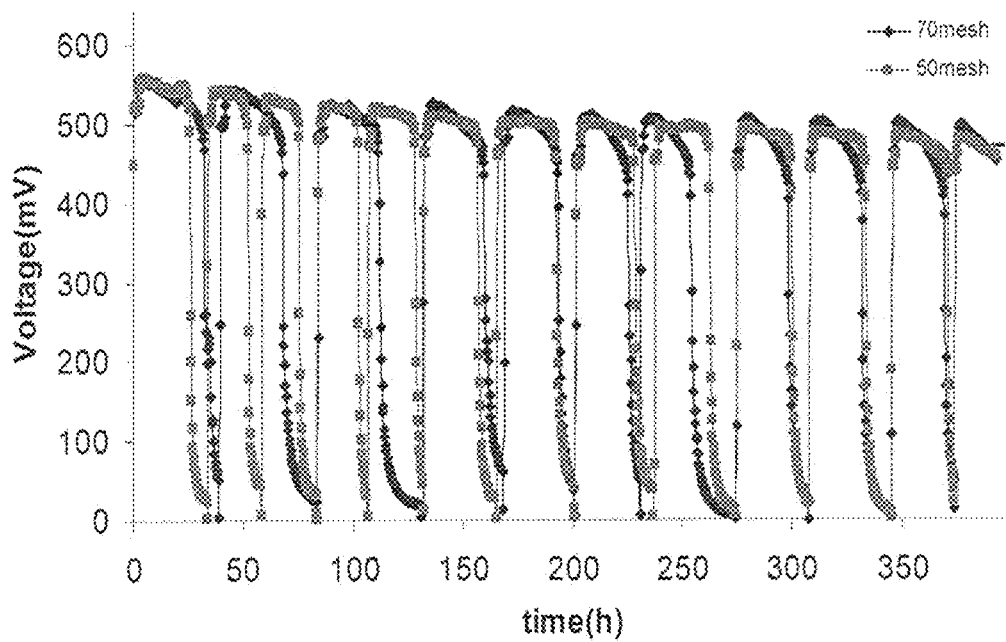
FIG. 27 is a graph showing voltage generation in an MFC using different SS mesh cathodes.
Figure 28:
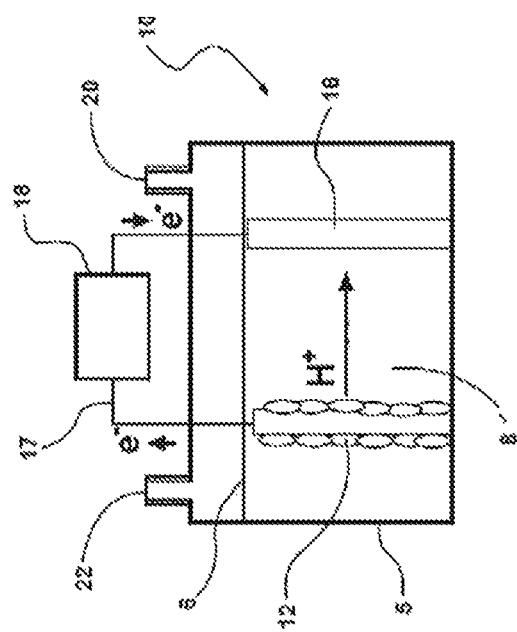
FIG. 28 illustrates an embodiment of an inventive MEC or MFC system without a separator.

FIG. 27 is a graph showing voltage generation in an MFC using cathodes containing SS U.S. standard mesh No. 50 or No. 70.

REFERENCES

ASTM. (2007) Document number A 959-07. Standard guide for specifying harmonized standard grade compositions for wrought stainless steels. Table I. Chemical Composition Limits, %.

Call, D. and Logan, B. E. (2008) Hydrogen production in a single chamber microbial electrolysis cell (MEC) lacking a membrane. *Environ. Sci. Technol.* 42(9), 3401-3406.

Cheng, S., Liu, H. and Logan, B. E. (2006) Power densities using different cathode catalysts (Pt and CoTMPP) and polymer binders (Nafion and PTFE) in single chamber microbial fuel cells. *Environ. Sci. Technol.* 40, 364-369.

Cheng, S. and Logan, B. E. (2007a) Ammonia treatment of carbon cloth anodes to enhance power generation of microbial fuel cells. *Electrochem. Commun.* 9(3), 492-496.

Cheng, S. and Logan, B. E. (2007b) Ammonia treatment of carbon cloth anodes to enhance power generation of microbial fuel cells. *Electrochem. Commun.* 9(3), 492-496.

Cheng, S. and Logan, B. E. (2007c) Sustainable and efficient biohydrogen production via electrohydrogenesis. *Proc. Natl. Acad. Sci. USA* 104(47), 18871-18873.

Daniele, S., Baldo, M. A., Bragato, C. and Lavagnini, 1. (1998) Steady state voltammetry in the process of hydrogen evolution in buffer solutions. *Analytica Chimica Acta* 361, 141-150.

Daniele, S., Lavagnini, I., Baldo, M. A. and Magno, F. (1996) Steady state voltammetry at microelectrodes for the hydrogen evolution from strong and weak acids under pseudo-first and second order kinetic conditions. *J. Electroanal. Chem.* 404, 105-111.

Dougherty, R. C. and Merrill, M. D. (2008) Composites and electrodes for electrochemical devices and processes for producing the same, USA.

Liu, H., Grot, S. and Logan, B. E. (2005) Electrochemically assisted microbial production of hydrogen from acetate. *Environ. Sci. Technol.* 39(11), 4317-4320.

Liu, H. and Logan, B. E. (2004) Electricity generation using an air-cathode single chamber microbial fuel cell in the presence and absence of a proton exchange membrane. *Environ. Sci. Technol.* 38(14), 4040-4046.

Liu, H., Ramnarayanan, R. and Logan, B. E. (2004) Production of electricity during wastewater treatment using a single chamber microbial fuel cell. *Environ. Sci. Technol.* 38(7), 2281-2285.

Logan, B., Cheng, S., Watson, V. and Estadt, G. (2007a) Graphite Fiber Brush Anodes for Increased Power Production in Air-Cathode Microbial Fuel Cells. *Environ. Sci. Technol.* 41(9), 3341-3346.

Logan, B. E. (2008) Microbial fuel cells, John Wiley & Sons, Inc., Hoboken, N.J.

Logan, B. E., Cheng, S., Watson, V. and Estadt, G. (2007b) Graphite fiber brush anodes for increased power production in air-cathode microbial fuel cells. *Environ. Sci. Technol.* 41(9), 3341-3346.

Olivares-Ramirez, J. M., Campos-Cornelio, M. L., Godinez, J. U., Borja-Arco, E. and Castellanos, R. H. (2007) Studies on the hydrogen evolution reaction on different stainless steels. *Int. J. Hydrogen Energy* 32, 3170-3173.

Zuo, Y., Cheng, S., Call, D. and Logan, B. E. (2007) Tubular membrane cathodes for scalable power generation in microbial fuel cells. *Environ. Sci. Technol.* 41(9), 3347-3353.

Any patents or publications mentioned in this specification are incorporated herein by reference to the same extent as if each individual publication is specifically and individually indicated to be incorporated by reference. U.S. patent application Ser. Nos. 11/799,194; 12/145,722; 12/177,962; 11/180,454; 11/799,149; and U.S. Provisional Patent Application Ser. No. 61/141,511 are incorporated herein by reference in their entirety.

The compositions and methods described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

The invention claimed is:

1. An apparatus, comprising:
   a reaction chamber having a wall defining an interior of the reaction chamber and an exterior of the reaction chamber, wherein the reaction chamber is a single compartment with no separator present between the anode and cathode;
   an inflow channel for introduction of influent into the reaction chamber;
   an inflow regulator associated with the inflow channel and operable to regulate flow through the inflow channel into the reaction chamber;
   an outflow channel for removal of effluent from the reaction chamber;

an outflow regulator associated with the outflow channel and operable to regulate flow through the outflow channel out of the reaction chamber;

an anode at least partially contained within the interior of the reaction chamber;

a mesh cathode comprising stainless steel, nickel or titanium, wherein no exogenous noble metal catalyst is in contact with the mesh cathode, wherein microbes are in contact with the cathode, the cathode at least partially contained within the interior of the reaction chamber; and a power source in electrical communication with the anode and cathode for enhancing an electrical potential between the anode and cathode.

2. The apparatus of claim 1, wherein microbes are in contact with the anode.

3. The apparatus of claim 1, wherein the mesh cathode comprises nickel.

4. The apparatus of claim 1, wherein the mesh cathode comprises stainless steel.

5. The apparatus of claim 1, wherein the cathode is tubular in shape, having a wall defining an interior space, an interior wall surface, an exterior, and an exterior wall surface, wherein the wall comprises a stainless steel, nickel or titanium mesh, the mesh having a first mesh surface disposed towards the interior space and a second mesh surface disposed towards the exterior.

6. The apparatus of claim 5, wherein the tubular cathode has a cross section selected from the group consisting of: circular, oval, oblong, square and rectangular.

7. An apparatus, comprising:
a reaction chamber having a wall defining an interior of the reaction chamber and an exterior of the reaction chamber, wherein the reaction chamber is a single compartment with no separator present between the anode and cathode;

an inflow channel for introduction of influent into the reaction chamber;

an inflow regulator associated with the inflow channel and operable to regulate flow through the inflow channel into the reaction chamber;

an outflow channel for removal of effluent from the reaction chamber;

an outflow regulator associated with the outflow channel and operable to regulate flow through the outflow channel out of the reaction chamber;

an anode at least partially contained within the interior of the reaction chamber;

a mesh cathode comprising stainless steel of a type selected from the group consisting of: type 304, type 316, 420, and A286, wherein no exogenous noble metal catalyst is in contact with the mesh cathode, the cathode at least partially contained within the interior of the reaction chamber; and a power source in electrical communication with the anode and cathode for enhancing an electrical potential between the anode and cathode.

8. The apparatus of claim 7, wherein microbes are in contact with the cathode.

9. The apparatus of claim 7, wherein microbes are in contact with the anode.

10. The apparatus of claim 7, wherein the cathode is tubular in shape, having a wall defining an interior space, an interior wall surface, an exterior, and an exterior wall surface, wherein the wall comprises a stainless steel, nickel or titanium mesh, the mesh having a first mesh surface disposed towards the interior space and a second mesh surface disposed towards the exterior.

11. An apparatus, comprising:
a reaction chamber having a wall defining an interior of the reaction chamber and an exterior of the reaction chamber, wherein the reaction chamber is a single compartment with no separator present between the anode and cathode;

an inflow channel for introduction of influent into the reaction chamber;

an inflow regulator associated with the inflow channel and operable to regulate flow through the inflow channel into the reaction chamber;

an outflow channel for removal of effluent from the reaction chamber;

an outflow regulator associated with the outflow channel and operable to regulate flow through the outflow channel out of the reaction chamber;

an anode at least partially contained within the interior of the reaction chamber;

a mesh cathode comprising stainless steel, nickel or titanium, wherein the mesh has a first mesh surface and a second mesh surface and wherein a coating is present on the first mesh surface, the second mesh surface or both the first mesh surface and the second mesh surface, wherein no exogenous noble metal catalyst is in contact with the mesh cathode, the cathode at least partially contained within the interior of the reaction chamber; and a power source in electrical communication with the anode and cathode for enhancing an electrical potential between the anode and cathode.

12. The apparatus of claim 11, wherein the coating on the second mesh surface is a water impermeable coating.

13. The apparatus of claim 11, wherein the coating on the second mesh surface is an oxygen impermeable coating.

14. The apparatus of claim 11, wherein the coating on the second mesh surface is an oxygen permeable coating.

15. The apparatus of claim 11, wherein the coating on the first mesh surface, second mesh surface or both the first mesh surface and second mesh surface comprises an electron conductive binder.

16. The apparatus of claim 11, wherein the coating on the first mesh surface, second mesh surface or both the first mesh surface and second mesh surface comprises an exogenous non-noble metal catalyst.

17. The apparatus of claim 11, wherein microbes are in contact with the cathode.

18. The apparatus of claim 11, wherein microbes are in contact with the anode.

19. The apparatus of claim 11, wherein the mesh cathode comprises nickel.

20. The apparatus of claim 11, wherein the mesh cathode comprises stainless steel.

* * * * *